US012154504B2

(12) United States Patent
Moon et al.

(10) Patent No.: US 12,154,504 B2
(45) Date of Patent: Nov. 26, 2024

(54) DISPLAY DEVICE AND METHOD OF DRIVING THE SAME

(71) Applicant: SAMSUNG DISPLAY CO., LTD., Yongin-si (KR)

(72) Inventors: Gyeong Ub Moon, Suwon-si (KR); Jong Yeop An, Hwaseong-si (KR); Hyeon Jun Lee, Hanam-si (KR); Bo Ram Choi, Asan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/046,068

(22) Filed: Oct. 12, 2022

(65) Prior Publication Data

US 2023/0230544 A1 Jul. 20, 2023

(30) Foreign Application Priority Data

Jan. 19, 2022 (KR) ........................ 10-2022-0007700

(51) Int. Cl.

*G09G 5/02* (2006.01)
*G09G 3/3233* (2016.01)

(52) U.S. Cl.

CPC ............. *G09G 3/3233* (2013.01); *G09G 5/02* (2013.01); *G09G 2310/0267* (2013.01); *G09G 2340/0435* (2013.01)

(58) Field of Classification Search

CPC .................. G09G 3/3233; G09G 5/02; G09G 2310/0267; G09G 2340/0435

See application file for complete search history.

(56) References Cited

U.S. PATENT DOCUMENTS

| | | | | |
|---|---|---|---|---|
| 2020/0042759 | A1* | 2/2020 | Kim | G06F 3/0445 |
| 2023/0200690 | A1* | 6/2023 | Haga | A61B 5/1455 600/300 |

FOREIGN PATENT DOCUMENTS

| | | |
|---|---|---|
| KR | 10-2018-0053746 | 5/2018 |
| KR | 10-2021-0014559 | 2/2021 |
| KR | 10-2021-0028302 | 3/2021 |
| KR | 10-2021-0064483 | 6/2021 |

* cited by examiner

*Primary Examiner* — Robert J Michaud
(74) *Attorney, Agent, or Firm* — F. Chau & Associates, LLC

(57) ABSTRACT

A display device is provided that includes a plurality of pixels, a plurality of optical sensors, an emission line connected to the pixels, and an emission driver connected to the emission line. The emission driver outputs a first emission signal to the emission line having a first frame frequency in a first mode for displaying an image using the pixels and outputs a second emission signal to the emission line having a second frame frequency in a second mode for sensing light using the optical sensors. The second frame frequency is different from the first frame frequency.

20 Claims, 26 Drawing Sheets

DISPLAY DEVICE AND METHOD OF DRIVING THE SAME

This U.S. non-provisional patent application claims priority under 35 U.S.C. § 119 to Korean Patent Application No. 10-2022-0007700, filed on Jan. 19, 2022, in the Korean Intellectual Property Office, the disclosure of which is incorporated by reference in its entirety herein.

1. Technical Field

The disclosure relates to a display device and a method of driving the same.

2. Discussion of Related Art

A display device may be a flat panel display device such as a liquid crystal display, a field emission display and a light emitting display. Such display devices are far lighter and thinner than traditional cathode ray tube display devices and may be used not only as a television (TV) or a monitor but also as a portable smartphone or a tablet personal computer (PC). A portable display device may be equipped with various functions. A camera and a fingerprint sensor are some of the examples of the functions.

With the recent spotlight on the healthcare industry, methods of obtaining biometric information about health more easily are being developed. In medicine, heart rate (or pulse rate) is the speed of the heartbeat measured by the number of contractions (beats) of the heart per minute (bpm). An oscillometric pulse measurement device may be used to measure the pulse rate. For example, attempts are being made to change a an oscillometric pulse measurement device into a portable electronic device. However, the electronic pulse measurement device requires an independent light source, sensor and display and has the inconvenience of having to be carried separately.

SUMMARY

At least one embodiment of the disclosure provides a display device capable of preventing waveform distortion of a pulse wave signal and a method of driving the display device.

According to an embodiment of the disclosure, a display device includes a plurality of pixels, a plurality of optical sensors, an emission line connected to the pixels, an emission driver connected to the emission line. The emission driver outputs a first emission signal to the emission line having a first frame frequency in a first mode for displaying an image using the pixels and outputs a second emission signal to the emission line having a second frame frequency in a second mode for sensing light using the optical sensors. The second frame frequency is different from the first frame frequency.

The second frame frequency may be higher than the first frame frequency.

In an embodiment, the display device may further includes, a scan line and a data line connected to the pixels, and a display driver having a scan driver connected to the scan line and a data driver connected to the data line, and the display driver outputs a display control signal having the first frame frequency in the first mode and the second mode.

The second frame frequency may be higher than the first frame frequency.

The first frame frequency may range from 60 to 120 Hz, and the second frame frequency may range from 100 to 240 Hz.

The display device may include an emission controller outputting a first emission control signal to the emission driver in the first mode and outputting a second emission control signal to the emission driver in the second mode.

The display device may further include a pulse wave controller outputting a mode control signal indicating the first mode or the second mode to the emission controller.

The pulse wave controller may include a pulse wave receiver measuring a pulse using a pulse wave signal received from each of the optical sensors.

The pulse wave receiver may include, a light reception data determiner receiving an electrical signal from each of the optical sensors and determining light reception data, a pulse wave signal generator generating a pulse wave signal using the light reception data, and a pulse wave measurer measuring a pulse using the pulse wave signal.

According to embodiment of the disclosure, a display device includes a plurality of pixels, a plurality of optical sensors, a scan line and an emission line connected to the pixels, a scan driver connected to the scan line, and an emission driver connected to the emission line. The scan driver outputs a scan signal having a first frame frequency to the scan line in a pulse wave measurement mode for sensing light using the optical sensors, and the emission driver outputs an emission signal having a second frame frequency different from the first frame frequency to the emission line in the pulse wave measurement mode.

The second frame frequency may be higher than the first frame frequency.

The emission driver may output a second emission signal having the first frame frequency in the pulse wave measurement mode.

The display device may further include an emission controller outputting a first emission control signal to the emission driver in a first mode for displaying an image using the pixels and outputting a second emission control signal to the emission driver in the pulse wave measurement mode.

According to embodiment of the disclosure, a display device includes a general pixel, a pulse wave display pixel, a first emission line connected to the general pixel for providing a first emission signal to the general pixel, an AND circuit connected to the pulse wave display pixel, and a second emission line and a third emission line connected to the AND circuit. The AND circuit outputs a gate-on voltage when both a second emission signal of the second emission line and a third emission signal of the third emission line have the gate-on voltage.

The display device may further include, an optical sensor, and an emission driver outputting the second emission signal at a first frame frequency in a first mode for displaying an image using the general pixel and the pulse wave display pixel and outputting the second emission signal at a second frame frequency higher than the first frame frequency in a second mode for sensing light using the optical sensor.

The emission driver may output the third emission signal as the gate-on voltage in the first mode and the second mode.

The emission driver may output the third emission signal at the first frame frequency in the first mode and outputs the third emission signal as the gate-on voltage in the second mode.

The emission driver may output a first emission signal of the first emission line at the first frame frequency in the first mode and the second mode.

According to embodiment of the disclosure, a method of driving a display device, the method includes outputting a first emission signal to a plurality of pixels based on a first frame frequency in a first mode, outputting a second emission signal to the pixels based on a second frame frequency different from the first frame frequency in a second mode, sensing light reflected from a user in the second mode, calculating a pulse wave signal based on the sensed light in the second mode, and calculating a pulse based on the pulse wave signal in the second mode.

The second frame frequency may be higher than the first frame frequency.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The invention will now be described more fully hereinafter with reference to the accompanying drawings, in which example embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the invention. Similarly, the second element could also be termed the first element.

Hereinafter, embodiments will be described with reference to the accompanying drawings.

Figure 1:
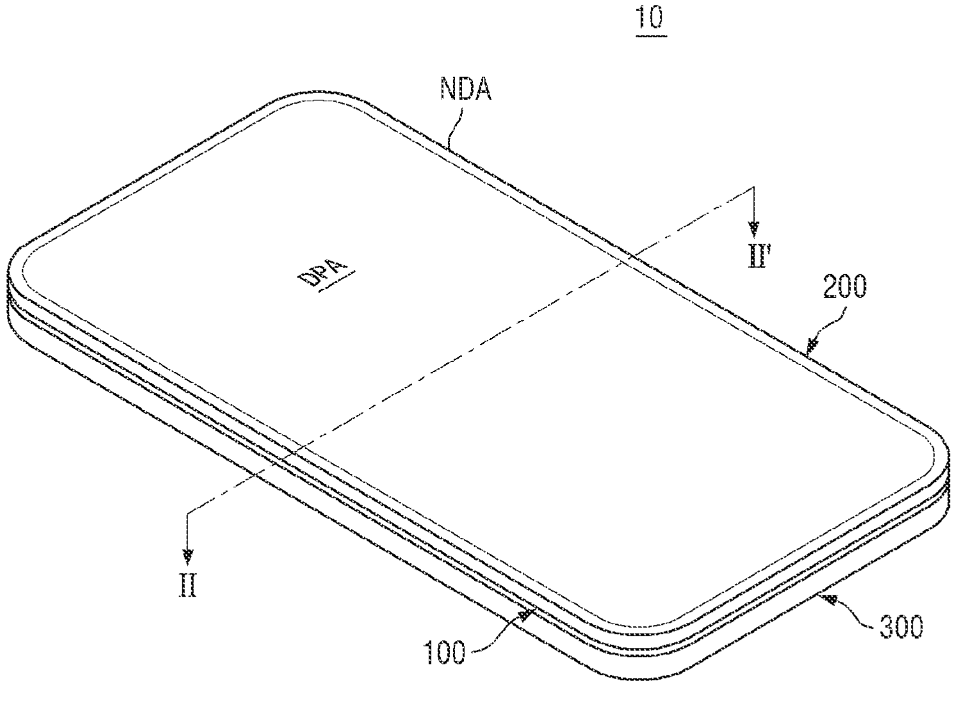
FIG. 1 is a schematic perspective view of a display device according to an embodiment.
Figure 2:
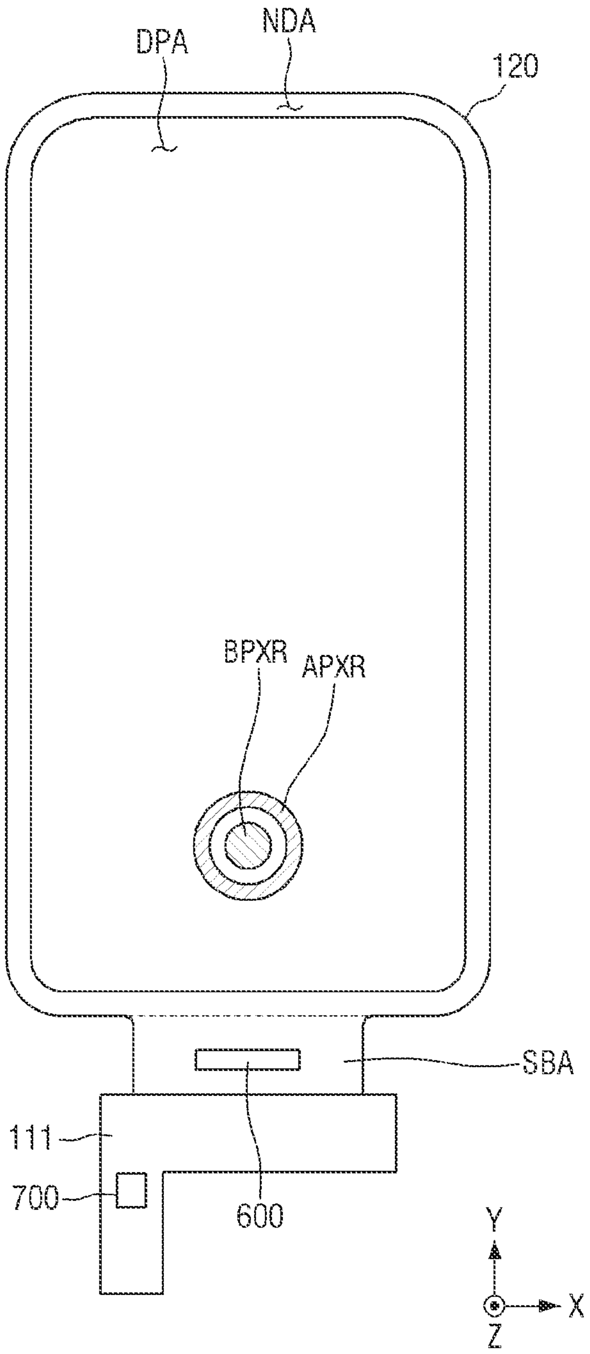
FIG. 2 is a plan view illustrating a display panel, a display circuit board, a display driving circuit, and a touch driving circuit according to an embodiment.
Figure 3:
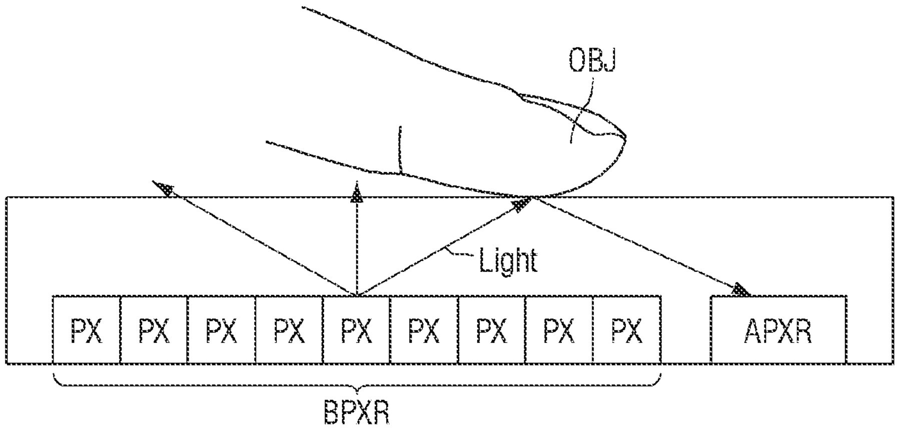
FIG. 3 is a schematic cross-sectional view illustrating a situation where a pulse is measured in the display device according to the embodiment.

FIG. 1 is a schematic perspective view of a display device 10 according to an embodiment. FIG. 2 is a plan view illustrating a display panel 100, a display circuit board 111, a display driving circuit, and a touch driving circuit according to an embodiment. FIG. 3 is a schematic cross-sectional view illustrating a situation where a pulse is measured in the display device 10 according to the embodiment.

Referring to FIG. 1, the display device 10 is capable of displaying moving images or still images. Examples of the display device 10 may include, but are not limited to, smartphones, mobile phones, tablet personal computers (PCs), personal digital assistants (PDAs), portable multimedia players (PMPs), televisions, game consoles, wristwatch-type electronic devices, head mounted displays, monitors of PCs, notebook computers, car navigation systems, car dashboards, digital cameras, camcorders, external billboards, electronic signboards, various medical devices, various inspection devices, various home appliances including a display unit such as refrigerators and washing machines, and Internet of things (IoT) devices.

The display device 10 may include the display panel 100 that provides light constituting a screen. Examples of the display panel 100 may include self-luminous display panels such as organic light emitting display (OLED) panels, inorganic electroluminescent (EL) display panels, quantum dot light emitting display (QED) panels, micro-light emitting diode (LED) display panels, nano-LED display panels, plasma display panels (PDPs), field emission display (FED) panels and cathode ray tube (CRT) display panels and light receiving display panels such as liquid crystal display (LCD) panels and electrophoretic display (EPD) panels. An OLED panel will hereinafter be described as an example of the display panel 100. Unless a special distinction is required, the OLED panel applied to embodiments will be simply abbreviated to the display panel 100. However, embodiments are not limited to the OLED panel, and other display panels listed above or known in the art are also applicable within the scope sharing the technical spirit.

A direction in which the display panel 100 provides light to the outside is a thickness direction of the display panel 100. The display panel 100 may be classified as a front display panel, a rear display panel, or a double-sided display panel according to a direction in which it provides light. Here, "front" refers to a direction in which an element providing light, for example, a light emitting element, is positioned with respect to a substrate 110 of the display panel 100, and "rear" refers to a direction opposite to the direction in which the light emitting element is positioned with respect to the substrate 110.

The display device 10 may further include a window member 200 disposed on the display panel 100 and a cover member 300 disposed under the display panel 100. The window member 200 and the cover member 300 may have a larger size than the display panel 100 in a plan view.

Referring to FIGS. 1 through 3, the display device 10 may include the display panel 100, a display driver 600 (e.g., a driver circuit), the display circuit board 111, and a pulse wave controller 700 (e.g., a control circuit).

The display device 10 may include a display area DPA and a non-display area NDA.

The display area DPA may have a rectangular planar shape. However, embodiments are not limited thereto, and the display area DPA may also have various planar shapes such as a square, a rhombus, a circle, and an oval.

The display area DPA includes a display area in which a screen is displayed. The display area DPA may completely overlap the display area. A plurality of pixels PX for displaying an image may be disposed in the display area. Each pixel PX may include a light emitting element EL (see FIG. 8).

The non-display area NDA may be disposed around the display area DPA. The non-display area NDA may entirely or partially surround the display area DPA. Signal lines may be disposed in the non-display area NDA to transmit signals to the display area DPA or transfer signals detected in the display area DPA. The non-display area NDA may correspond to a bezel area of the display device 10. Although the non-display area NDA is disposed around all sides of the rectangular display area DPA in the drawings, embodiments are not limited thereto. For example, the non-display area NDA may not be disposed around some sides of the display area DPA. Alternatively, the non-display area NDA may be bent toward a rear surface of the display area DPA to overlap the display area DPA in the thickness direction so that the non-display area NDA looks as if it is omitted in a plan view. In an embodiment, none of the pixels PX are present in the non-display area NDA.

The display area DPA may include a general active area NPXR, a pulse wave display area BPXR, and a pulse wave measurement area APXR in a pulse wave measurement mode for measuring a pulse wave. An active area of each pixel PX emitting light to measure a pulse wave may be defined as the pulse wave display area BPXR, and an active area of each optical sensor PS may be defined as the pulse wave measurement area APXR. In addition, in a display mode for displaying an image and/or the pulse wave measurement mode, a pixel area of each pixel PX emitting light to display image data in the display area DPA may be defined as the general active area NPXR. For ease of description, the display mode will hereinafter be referred to as a first mode, and the pulse wave measurement mode will hereinafter be referred to as a second mode.

Specifically, the pulse wave display area BPXR may be an area that emits light in the first mode and the second mode. The pulse wave measurement area APXR may be an area that senses the amount or wavelength of incident light in the second mode. The pulse wave measurement area APXR may measure a pulse wave by sensing light reflected by a user's finger OBJ after being emitted from the pulse wave display area BPXR of the second mode. In this case, in the second mode, each optical sensor PS of the pulse wave measurement area APXR may measure a pulse wave corresponding to a frame frequency emitted from a plurality of pixels PX.

The pulse wave measurement area APXR may overlap the display area DPA. For example, the pulse wave measurement area APXR may be disposed only in a limited area necessary for measuring a pulse wave within the display area DPA. As illustrated in FIG. 2, the pulse wave measurement area APXR may surround the pulse wave display area BPXR. The pulse wave display area BPXR may be formed in a circular shape in a plan view, and the pulse wave measurement area APXR may have a donut or annulus shape surrounding the pulse wave display area BPXR. In this case, the pulse wave measurement area APXR overlaps a portion of the display area, but does not overlap other portions of the display area. Alternatively, the pulse wave measurement area APXR may be defined as exactly the same area as the display area DPA. In this case, the entire surface of the display area DPA may be used as an area for measuring a pulse wave.

A plurality of optical sensors PS that react to light may be disposed in the pulse wave measurement area APXR. Each of the optical sensors PS may include a photoelectric converter PD (see FIG. 8) that detects incident light and converts the detected light into an electrical signal.

Specifically, light received by the optical sensors PS in the second mode may include light from pixels PX of the pulse wave display area BPXR, light from pixels PX of the general active area NPXR, and/or light incident from the outside (external light) regardless of the pixels PX. The general active area NPXR may be an area including pixels that is outside the pulse wave display area BPXR and outside the pulse wave measurement area APXR. In a pulse measuring process, a user places the finger OBJ close to an upper surface of the window member 200. For example, the user may place a finger OBJ on the upper surface over the pulse wave measurement area APXR. Therefore, light incident on the optical sensors PS originates mainly from the pixels PX. Among the pixels PX, the pixels PX of the pulse wave display area BPXR are disposed adjacent to the optical sensors PS, and their luminance is greater than that of the pixels PX of the general active area NPXR. Therefore, the amount of light emitted from the pixels PX of the pulse wave display area BPXR and then reflected from the user's finger OBJ may determine the amount of light received by the optical sensors PS.

The display panel 100 may include a sub-area SBA protruding from a side of the display area DPA and the non-display area NDA. The display circuit board 111, the display driver 600, and the pulse wave controller 700 may be attached to the sub-area SBA of the display panel 100.

The display driver 600 may drive the pixels PX and/or the optical sensors PS. The display driver 600 may output a data signal, a power supply voltage, a gate control signal, and an emission control signal for driving the display panel 100. The display driver 600 may supply a data voltage to a data line (DL). The data line may be connected to the pixels PX. The display driver 600 may supply a power supply voltage to a power line and may supply a scan control signal SCS to a scan driver 610. The display driver 600 may supply an emission control signal corresponding to an emission frame frequency to an emission line. For example, the display driver 600 may supply a first emission control signal corresponding to a first frame frequency to the pixels PX of the display panel 100 so that the pixels PX can display an image according to an input.

The display driver 600 may be attached onto the sub-area SBA. In addition, the display driver 600 may be formed as an integrated circuit and mounted on the display panel 100 by using a chip on plastic (COP) method or a chip on glass (COG) method.

The pulse wave controller 700 may be disposed on the display circuit board 111. The pulse wave controller 700 may be formed as an integrated circuit and attached to an upper surface of the display circuit board 111. Alternatively, the display driver 600 and the pulse wave controller 700 may be integrated into one integrated circuit in some cases.

The pulse wave controller 700 may measure a user's pulse wave by receiving a current flowing through the optical sensors PS of the display panel 100. The pulse wave controller 700 may be formed as an integrated circuit and attached onto the display circuit board 111 by using a chip on film (COF) method. However, embodiments are not limited thereto, and the pulse wave controller 700 may also be attached onto a non-active area of the display panel 100 by using the COG method, the COP method, or an ultrasonic bonding method. The pulse wave controller 700 may be electrically connected to the display driver 600 through the display circuit board 111. The pulse wave controller 700 will be described in detail later with reference to FIG. 9.

Schematic cross-sectional structures of display devices according to various embodiments will now be described.

Figure 4:
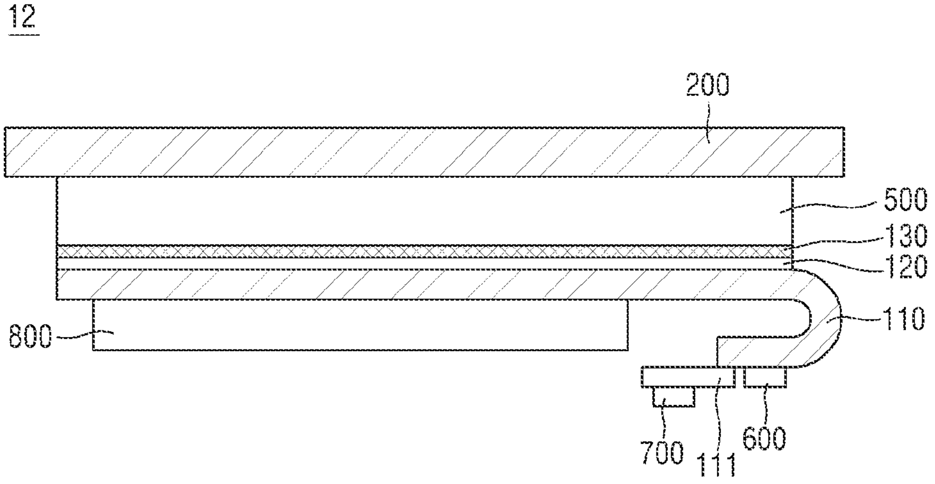
FIG. 4 is a cross-sectional view of a display device according to an embodiment.

FIG. 4 is a cross-sectional view of a display device 12 according to an embodiment. The display device 12 may be used to implement the display device 10 of FIG. 1.

Referring to FIG. 4, the display device 12 includes a window member 200 disposed on a surface of a display panel 100, a transparent bonding layer 500 disposed between the display panel 100 and the window member 200, and a display driver 600 and a pulse wave controller 700 mounted on the surface of the display panel 100. The window member 200 may be a window made of a transparent material such as glass or plastic.

The display panel 100 includes a substrate 110, a display layer 120 disposed on the substrate 110, and a touch layer 135 disposed on the display layer 120.

The substrate 110 may have flexible characteristics. The substrate 110 having flexible characteristics can be curved, bent, folded, or stretched. As illustrated, one side of the substrate 110 may be bent in a rear direction. A driver such as the display driver 600 may be disposed at an end of the bent substrate 110. The display driver 600 may be attached and mounted on a surface of the bent substrate 110. When an area in which the display driver 600 is disposed is bent in this way in the rear direction of the substrate 110, the area of a non-display area NDA viewed from the front may be reduced.

As described above, a display circuit board 111 may be disposed on the substrate 110, and the pulse wave controller 700 may be disposed on the display circuit board 111.

The display layer 120 is disposed on the substrate 110. The display layer 120 may include a circuit layer and a light emitting layer and a light receiving layer disposed on the circuit layer. The circuit layer receives a driving signal from the display driver 600 to control the emission amount and emission time of the light emitting layer. In addition, the circuit layer transfers charges generated from the light receiving layer to the display driver 600. A portion of the display driver 600 may be mounted on the surface of the substrate 110 in the form of an integrated circuit, but embodiments are not limited thereto.

The touch layer 130 is disposed on the display layer 120. The touch layer 130 is capable of recognizing a touch input of a user by using a method such as a capacitive method or a pressure method.

The transparent bonding layer 500 is disposed on the touch layer 130, and the window member 200 is disposed on the transparent bonding layer 500. The window member 200 may be bonded to the display panel 100 by the transparent bonding layer 500. Optically transparent materials known as an optically clear adhesive (OCA) and an optically clear resin (OCR) may be used to form the transparent bonding layer 500.

A buffer member 800 is disposed on a lower surface of the display panel 100. For example, the buffer memory 800 may be disposed on a substrate 810 that is disposed on a bottom surface of the substrate 110. The buffer member 800 may have elasticity and thus absorb an external shock. Since the external shock is absorbed by the buffer member 800, damage to each member constituting the display device 10 can be prevented. The buffer member 800 may include, but is not limited to, polyurethane and may be provided in the form of a film.

Figure 5:
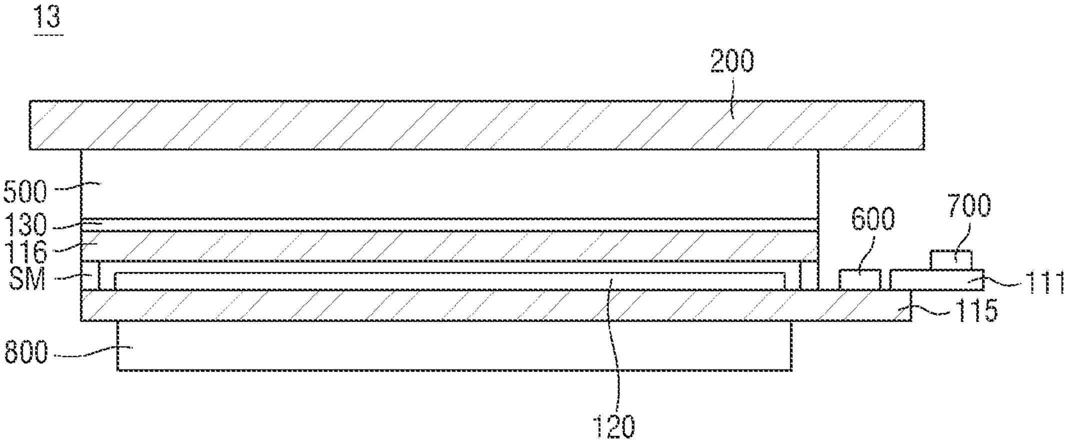
FIG. 5 is a cross-sectional view of a display device according to an embodiment.

FIG. 5 is a cross-sectional view of a display device 13 according to an embodiment. The display device 13 may be used to implement the display device 10 of FIG. 1.

In the embodiment of FIG. 5, a display panel of the display device 13 may include a rigid first substrate 115.

Referring to FIG. 5, the display panel includes the first substrate 115 made of a rigid material such as glass, and a display layer 120 is disposed on the first substrate 115. A second substrate 116 made of a rigid material such as glass is disposed on the display layer 120. The second substrate 116 faces the first substrate 115 and is bonded to the first substrate 115 through a sealing member SM at an edge portion. One end of the first substrate 115 may protrude outwardly from one end of the second substrate 116, and a display driver 600 may be mounted on a surface of the protruding first substrate 115.

A touch layer 130 is provided on a surface of the second substrate 116, and a transparent bonding layer 500 and a window member 200 are sequentially stacked on the touch layer 130.

A buffer member 800 may be disposed on a lower surface of the first substrate 115.

A display circuit board 111 may be disposed on the first substrate 115, and a pulse wave controller 700 may be disposed on the display circuit board 111.

Figure 6:
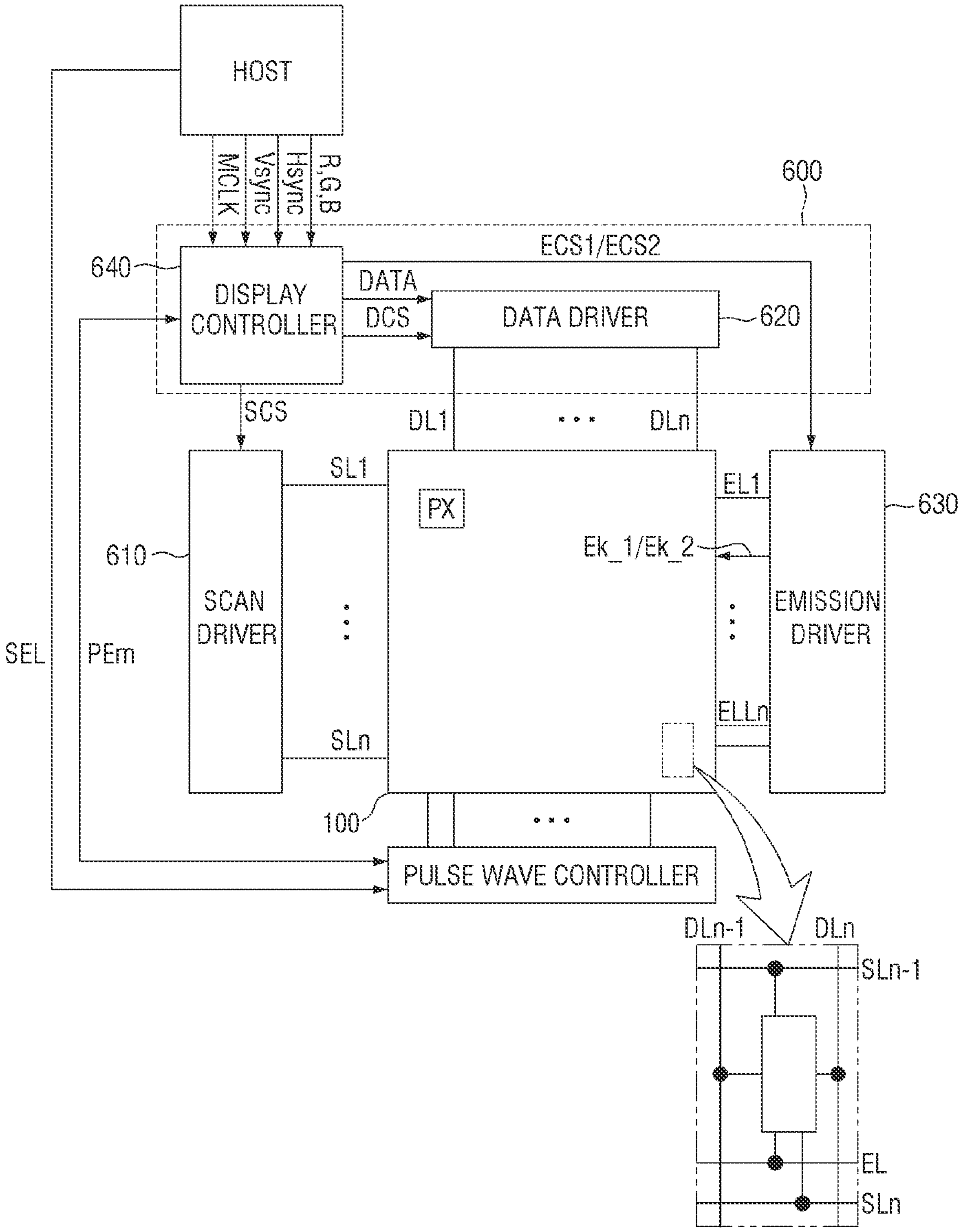
FIG. 6 is a block diagram of a display device according to an embodiment.

FIG. 6 is a block diagram of a display device 10 according to an embodiment.

Referring to FIG. 6, the display device 10 includes a display panel 100 including a plurality of pixels PX, a display driver 600, a scan driver 610, an emission driver 630, and a pulse wave controller 700. The display device 10 may further include a detecting driver connected to the pulse wave controller 700 and the display panel 100.

The pulse wave controller 700 may change a mode of the display device 10 to a first mode or a second mode according to a host or user's choice. The pulse wave controller 700 may receive a selection signal SEL from the host and generate a mode control signal PEm for controlling a display controller 640 according to the selection signal SEL. For example, the pulse wave controller 700 may output the mode control signal PEm having a first logic level voltage in the first mode and output the mode control signal PEm having a second logic level voltage in the second mode according to the selection signal SEL. The first logic level voltage may be a high logic level voltage, and the second logic level voltage may be a low logic level voltage.

In addition, the pulse wave controller 700 may measure a pulse wave by receiving measured information from the pulse wave measurement area APXR. This will be described later with reference to FIG. 10.

The display controller 640 receives an image signal supplied from the outside of the display device 10. In addition, the display controller 640 may generate a scan control signal SCS for controlling the operation timing of the scan driver 610, an emission control signal ECS1/ECS2 for controlling the operation timing of the emission driver 630, and a data control signal DCS for controlling the operation timing of a data driver 620. The display controller 640 may output image data DATA and the data control signal DCS to the data driver 620. The display controller 640 may output the scan control signal SCS to the scan driver 610 and output the emission control signal ECS1/ECS2 to the emission driver 630. The scan driver 610 provides scan signals to scan lines (e.g., SL1, . . . , SLn). The host may provide a main clock signal MCLK, vertical synchronization signal Vsync, a horizontal synchronization signal Hsync, and red (R)/green (G)/blue (B) image data. The display controller 640 may receive the mode control signal PEm from the pulse wave controller 700. The display controller 640 may generate the emission control signal ECS1/ECS2 based on the mode control signal PEm. For example, the display controller 640 may generate a first emission control signal ECS1 having a first frame frequency in the first mode based on the mode control signal PEm and generate a second emission control signal ECS2 having a second frame frequency in the second mode based on the mode control signal PEm. The first frame frequency may be lower than the second frame frequency. The display controller 640 may output the first emission control signal ECS1 to the emission driver 630 in the first mode and output the second emission control signal ECS2 to the emission driver 630 in the second mode.

The display controller 640 may be electrically connected to the display panel 100 and/or the pulse wave controller 700 through wiring or may be connected to the display panel 100 and/or the pulse wave controller 700 through a communication network. In an embodiment, at least a portion of the display controller 640 may be directly attached onto the display panel 100 in the form of a driving chip.

The data driver 620 may receive the image data DATA and the data control signal DCS from the display controller 640. The data driver 620 may convert the image data DATA into analog data voltages according to the data control signal DCS. The data driver 620 may output the analog data voltages to data lines DL (e.g., DL1, . . . , DLn) in synchronization with scan signals.

The scan driver 610 may generate scan signals according to the scan control signal SCS and sequentially output the scan signals to scan lines SL1 through SLn.

Although not illustrated in the drawing, a driving voltage ELVDD (see FIG. 8), a common voltage ELVSS (see FIG. 8), and a power supply voltage line (not illustrated) may be further provided by a voltage generator or a power supply. The power supply voltage line may include a driving voltage line and a common voltage line. The driving voltage ELVDD may be a high potential voltage for driving a light emitting element and a photoelectric converter, and the common voltage ELVSS (see FIG. 8) may be a low potential voltage for driving the light emitting element and the photoelectric converter. That is, the driving voltage ELVDD (see FIG. 8) may have a higher potential than the common voltage ELVSS (see FIG. 8).

A display control signal may include the scan control signal SCS, the data control signal DCS, and the emission control signal ECS1/ECS2. The display control signal may be output from the scan driver 610 and the data driver 620.

The display control signal may have the first frame frequency. For example, the display control signal having the first frame frequency may control the pixels PX to emit light at the first frame frequency in the first mode and/or the second mode.

The emission driver 630 may generate an emission signal Ek_1/Ek_2 according to the emission control signal ECS1/ECS2 and sequentially output the emission signal Ek_1/Ek_2 to emission lines ELL. Although the emission driver 630 is illustrated as being separate from the scan driver 610, embodiments are not limited thereto, and the emission driver 630 may also be included in the scan driver 610.

The data driver 620 and the display controller 640 may be included in the display driver 600 that controls the operation of the display panel 100. The data driver 620 and the display controller 640 may be formed as integrated circuits and mounted on the display driver 600.

Each of the pixels PX may be connected to any one of the scan lines SL1 through SLn, any one of the data lines DL, and at least one of the emission lines ELL.

Each of a plurality of optical sensors PS may be connected to any one of the scan lines SL1 through SLn and any one of the readout lines ROL.

The scan lines SL1 through SLn may connect the scan driver 610 to each of the pixels PX and the optical sensors PS. The scan lines SL1 through SLn may provide a scan signal output from the scan driver 610 to each of the pixels PX.

The data lines DL may connect the data driver 620 to each of the pixels PX. The data lines DL may provide image data output from the data driver 620 to each of the pixels PX.

The emission lines ELL may connect the emission driver 630 to each of the pixels PX. The emission lines ELL may provide an emission signal output from the emission driver 630 to each of the pixels PX.

In summary, in response to the mode control signal PEm generated by the pulse wave controller 700, the emission driver 630 may output a first emission signal Ek_1 to an emission line having the first frame frequency in the first mode and output a second emission signal Ek_2 to an emission line having the second frame frequency in the second mode. Therefore, the pixels PX may emit light based on the first frame frequency in the first mode and may emit light based on the second frame frequency in the second mode.

However, embodiments are not limited thereto, and the selection signal SEL of the user or the host may also be directly transmitted to the display controller 640. In this case, the display controller 640 receiving the selection signal SEL may output the first emission signal Ek_1 having the first frame frequency in the first mode and output the second emission signal Ek_2 having the second frame frequency in the second mode.

Figure 7:
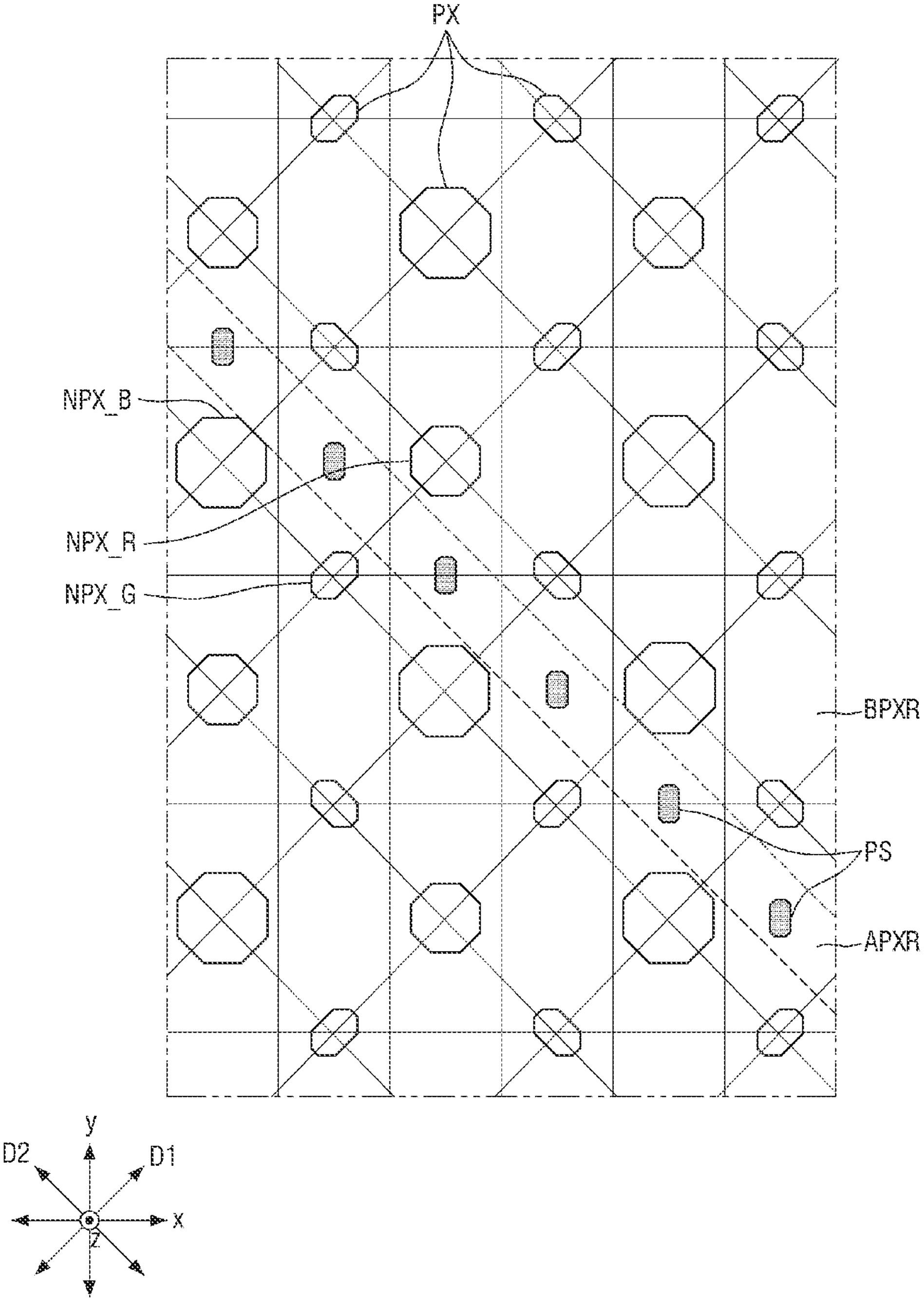
FIG. 7 is a layout view illustrating pixels of a display layer according to an embodiment.

FIG. 7 is a layout view illustrating pixels PX of a display layer according to an embodiment.

The pixels PX may include first pixels NPX_R, second pixels NPX_G, and third pixels NPX_B. In a pulse wave measurement mode, an active area of each pixel PX emitting light to measure a pulse wave is defined as a pulse wave display area BPXR, and an active area of each optical sensor PS is defined as a pulse wave measurement area APXR. The pulse wave measurement area APXR may detect the light emitted by the pulse wave display area BPXR. In addition, in an image display mode and/or the pulse wave measurement mode, a pixel area of each pixel PX emitting light to display image data in a display area DPA is defined as a general active area NPXR.

Referring to FIG. 7, pixels PX of the pulse wave display area BPXR and the general active area NPXR include the first pixels NPX_R, the second pixels NPX_G, and the third pixels NPX_B. Here, each of the first pixels NPX_R may be a general red display pixel emitting red light having a main wavelength within the range of about 600 to 750 nm. Each of the second pixels NPX_G may be a general green display pixel emitting green light having a main wavelength within the range of about 480 to 560 nm. Each of the third pixels NPX_B may be a general blue display pixel emitting blue light having a main wavelength within the range of about 370 to 460 nm. However, embodiments are not limited thereto.

In the second mode, the first pixels NPX_R among the pixels PX of the pulse wave display area BPXR may emit red light. In another embodiment, the first pixels NPX_R may emit red light, and the second pixels NPX_G may emit green light. When light emitted from a display pixel is irradiated to a peripheral blood vessel, the irradiated light may be absorbed by the blood of the peripheral blood vessel. In this case, the red and/or green light having a relatively long wavelength emitted from the display pixel may be easily absorbed by the blood, and thus the amount of light absorbed may be large. Therefore, when light having a relatively long wavelength is irradiated, a pulse wave can be accurately measured.

In an embodiment, the first pixels NPX_R and the third pixels NPX_B have a substantially octagonal shape and are alternately arranged along a row direction. In an embodiment, the second pixels NPX_G have a substantially octagonal or hexagonal shape and are arranged in the row direction (a first direction x). A row in which the first pixels NPX_R and the third pixels NPX_B are alternately arranged and a row in which the second pixels NPX_G are arranged are alternately arranged along a column direction (a second direction y).

The first pixels NPX_R and the third pixels NPX_B are alternately arranged along the column direction. In a corresponding row and column, each of the second pixels NPX_G is located between the first and third pixels NPX_R and NPX_B. The number of the second pixels NPX_G may be, but is not limited to, twice the number of the third pixels NPX_B. The second pixels NPX_G are divided into a first type that is longer in a first diagonal direction (a third direction D1) than in a second diagonal direction (a fourth direction D2) and a second type that is longer in the second diagonal direction (the fourth direction D2) than in the first diagonal direction (the third direction D1). The first type and the second type are alternately arranged along the row direction (the first direction x) and the column direction (the second direction y).

The pulse wave display area BPXR may be disposed adjacent to the pulse wave measurement area APXR. For example, the pulse wave display area BPXR may be disposed at an intersection of a row of the first pixels NPX_R and the third pixels NPX_B and a column of the second pixels NPX_G.

In the display mode, the pulse wave display area BPXR may, like the first pixels NPX_R, emit red light of various gray levels to form a display screen. For example, the pixels PX of the pulse wave display area BPXR may emit green light that is the same color as light emitted from the second pixels NPX_G. In this case, two second pixels NPX_G adjacent to the pulse wave measurement area APXR in the second direction y may be replaced with the pulse wave display area BPXR.

When a plurality of pixels PX are disposed in the pulse wave display area BPXR, all of the pixels PX of the pulse wave display area BPXR may emit light of the same color. The pixels PX of the pulse wave display area BPXR may include pixels PX of different colors of the pulse wave display area BPXR which emit light of two or more colors, such as red light-emitting pixels of the pulse wave display area BPXR and green light-emitting pixels of the pulse wave display area BPXR.

The pixels PX of the pulse wave display area BPXR may also be boost pixels that are substantially the same as the pixels of the general active area NPXR but have a greater luminance than the pixels of the general active area NPXR. When the pixels PX of the pulse wave display area BPXR are boost pixels having a greater luminance than the pixels of the general active area NPXR, the maximum luminance of light emitted from the pixels PX of the pulse wave display area BPXR may be greater than that of light emitted from the pixels of the general active area NPXR.

Optical sensors PS are disposed adjacent to the pixels PX of the pulse wave display area BPXR and may have a stacked structure similar to that of the pixels PX. The optical sensors PS may be disposed adjacent to the pixels PX of the pulse wave display area BPXR. Each of the optical sensors PS converts the amount of received light into an electrical signal.

Figure 8:
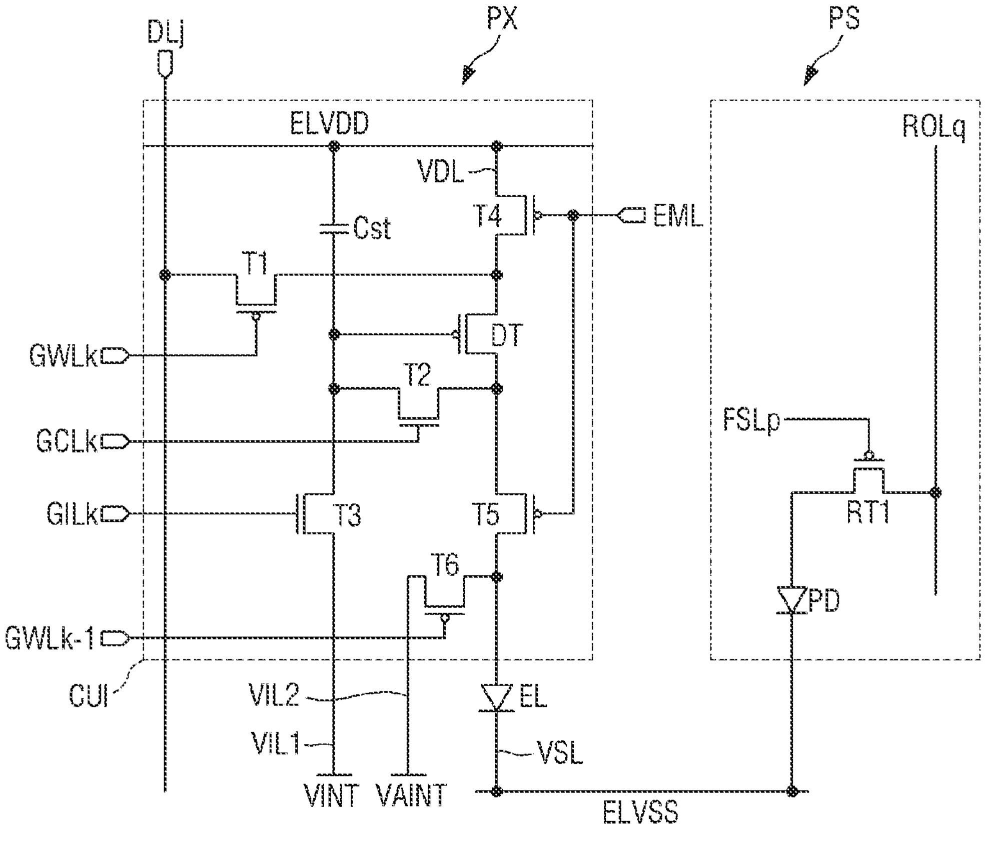
FIG. 8 is a circuit diagram of a pixel and an optical sensor according to an embodiment.

FIG. 8 is a circuit diagram of a pixel PX and an optical sensor PS according to an embodiment.

For ease of description, FIG. 8 illustrates a circuit diagram of each pixel PX connected to a $k^{th}$ scan initialization line GILk, a $k^{th}$ scan write line GWLk, a $k^{th}$ scan control line GCLk, a (k-1)th scan write line GWLk-1 and a $j^{th}$ data line DLj and an optical sensor PS connected to a common voltage line VSL, a qth sensing scan line FSLp and a qth sensing line ROLq.

Each pixel PX may include a light emitting element EL and a pixel circuit CUI controlling the amount of light emitted from the light emitting element EL. Each pixel circuit CUI may include a driving transistor DT, a plurality of switch elements, and a first capacitor Cst. The switch elements include first through sixth transistors T1 through T6.

The driving transistor DT may include a gate electrode, a first electrode, and a second electrode. The driving transistor DT controls a drain-source current Isd (hereinafter, referred to as a "driving current") flowing between the first electrode and the second electrode according to a data voltage applied to the gate electrode. The driving current Isd flowing through a channel of the driving transistor DT is proportional to the square of a difference between a voltage Vgs between the first electrode and the gate electrode of the driving transistor DT and a threshold voltage as shown in Equation 1.

$$Isd=k'\times(Vsg-Vth)^2, \quad (1)$$

where Isd is a driving current and a source-drain current flowing through the channel of the driving transistor DT, k' is a proportional coefficient determined by the structure and physical characteristics of the driving transistor DT, Vsg is a voltage between the first electrode and the gate electrode of the driving transistor DT, and Vth is a threshold voltage of the driving transistor DT.

The light emitting element EL emits light according to the driving current Isd. As the driving current Isd increases, the amount of light emitted from the light emitting element EL may increase.

The light emitting element EL may be an organic light emitting diode including an organic light emitting layer disposed between an anode and a cathode. Alternatively, the light emitting element EL may be a quantum dot light emitting element including a quantum dot light emitting layer disposed between an anode and a cathode. Alternatively, the light emitting element EL may be an inorganic light emitting element including an inorganic semiconductor disposed between an anode and a cathode. When the light emitting element EL is an inorganic light emitting element, it may include a micro-light emitting diode or a nano-light emitting diode. In FIG. 8, the anode of the light emitting element EL corresponds to a pixel electrode, and the cathode corresponds to a common electrode.

The anode of the light emitting element EL may be connected to a second electrode of a fifth transistor T5 and a first electrode of a sixth transistor T6, and the cathode may be connected to a common voltage line VSL to which a common voltage ELVSS is applied.

A first transistor T1 is turned on by a $k^{th}$ scan write signal of the $k^{th}$ scan write line GWLk to connect the first electrode of the driving transistor DT to the $j^{th}$ data line DLj. For example, the $k^{th}$ scan write signal may be applied to a gate of the first transistor T1. Accordingly, a data voltage of the $j^{th}$ data line DLj may be applied to the first electrode of the driving transistor DT. The first transistor T1 may have a gate electrode connected to the $k^{th}$ scan write line GWLk, a first electrode connected to the $j^{th}$ data line DLj, and a second electrode connected to the first electrode of the driving transistor DT.

A second transistor T2 is turned on by a $k^{th}$ scan control signal of the $k^{th}$ scan control line GCLk to connect the gate electrode and the second electrode of the driving transistor DT. For example, the $k^{th}$ scan control signal may be applied to a gate of the second transistor T2. When the gate electrode and the second electrode of the driving transistor DT are connected, the driving transistor DT is driven as a diode. The second transistor T2 may have a gate electrode connected to the $k^{th}$ scan control line GCLk, a first electrode connected to the gate electrode of the driving transistor DT, and a second electrode connected to the second electrode of the driving transistor DT.

A third transistor T3 is turned on by a $k^{th}$ scan initialization signal of the $k^{th}$ scan initialization line GILk to connect the gate electrode of the driving transistor DT to a first initialization voltage line VIL1. For example, the $k^{th}$ scan initialization signal may be applied to a gate of the third transistor T3. Accordingly, a first initialization voltage VINT of the first initialization voltage line VIL1 may be applied to the gate electrode of the driving transistor DT. The third transistor T3 may have a gate electrode connected to the $k^{th}$ scan initialization line GILk, a first electrode connected to the first initialization voltage line VIL1, and a second electrode connected to the gate electrode of the driving transistor DT.

A fourth transistor T4 is turned on by a kth emission control signal of a kth emission control line EML to connect the first electrode of the driving transistor DT to a driving voltage line VDL to which a driving voltage ELVDD is applied. For example, the kth emission control signal may be applied to a gate of the fourth transistor T4. The fourth transistor T4 may have a gate electrode connected to the $k^{th}$ emission control line ELk, a first electrode connected to the driving voltage line VDL, and a second electrode connected to the first electrode of the driving transistor DT.

The fifth transistor T5 is turned on by the $k^{th}$ emission control signal of the $k^{th}$ emission control line ELk to connect the second electrode of the driving transistor DT to the anode of the light emitting element EL. For example, the kth emission control signal may be applied to a gate of the fifth transistor T5. The fifth transistor T5 may have a gate electrode connected to the $k^{th}$ emission control line ELk, a first electrode connected to the second electrode of the driving transistor DT, and the second electrode connected to the anode of the light emitting element EL.

When both the fourth transistor T4 and the fifth transistor T5 are turned on, the driving current Isd of the driving transistor DT according to the voltage of the gate electrode of the driving transistor DT may flow to the light emitting element EL.

The sixth transistor T6 is turned on by a $(k-1)^{th}$ scan signal of the $(k-1)^{th}$ scan write line GWLk-1 to connect the anode of the light emitting element EL to a second initialization voltage line VIL2. For example, the $(k-1)^{th}$ scan signal may be applied to a gate of the sixth transistor T6. A second initialization voltage VAINT of the second initialization voltage line VIL2 may be applied to the anode of the light emitting element EL. The sixth transistor T6 may have a gate electrode connected to the $(k-1)^{th}$ scan write line GWLk-1, the first electrode connected to the anode of the light emitting element EL, and a second electrode connected to the second initialization voltage line VIL2.

The capacitor Cst is formed between the gate electrode of the driving transistor DT and the driving voltage line VDL. A first capacitor electrode of the first capacitor Cst may be connected to the gate electrode of the driving transistor DT, and a second capacitor electrode may be connected to the driving voltage line VDL.

When the first electrode of each of the driving transistor DT and the first through sixth transistors T1 through T6 is a source electrode, the second electrode may be a drain electrode. Alternatively, when the first electrode of each of the driving transistor DT and the first through sixth transistors T1 through T6 is a drain electrode, the second electrode may be a source electrode.

An active layer of each of the driving transistor DT and the first through sixth transistors T1 through T6 may be made of any one of polysilicon, amorphous silicon, and an oxide semiconductor. For example, the active layer of each of the driving transistor DT, the first transistor T1, and the fourth through sixth transistors T4 through T6 may be made of polysilicon. The active layer of each of the second transistor T2 and the third transistor T3 may be made of an oxide semiconductor. In this case, the driving transistor DT, the first transistor T1, and the fourth through sixth transistors T4 through T6 may be formed as P-type metal oxide semiconductor field effect transistors (MOSFETs), and the second transistor T2 and the third transistor T3 may be formed as N-type MOSFETs.

The optical sensor PS may be connected to a pth (p is a positive integer) sensing scan line FSLp and a qth (q is a positive integer) sensing line ROLq. In addition, the optical sensor PS may be connected to the common voltage line VSL.

The optical sensor PS may include a sensing transistor RT1 and a light receiving element PD.

The light receiving element PD may be a photodiode including an anode, a photoelectric conversion layer, and a cathode. The anode of the light receiving element PD may be connected to a first electrode of the first sensing transistor RT1, and the cathode may be connected to the common voltage line VSL.

The first sensing transistor RT1 is turned on by a scan signal of the pth sensing scan line FSLp to connect a sensing anode of the light receiving element PD to the qth sensing line ROLq. Accordingly, a voltage of the sensing anode of the light receiving element PD may be applied to the qth sensing line ROLq. The first sensing transistor RT1 may have a gate electrode connected to the pth sensing scan line FSLp, the first electrode connected to the sensing anode of the light receiving element PD, and a second electrode connected to the qth sensing line ROLq.

Figure 9:
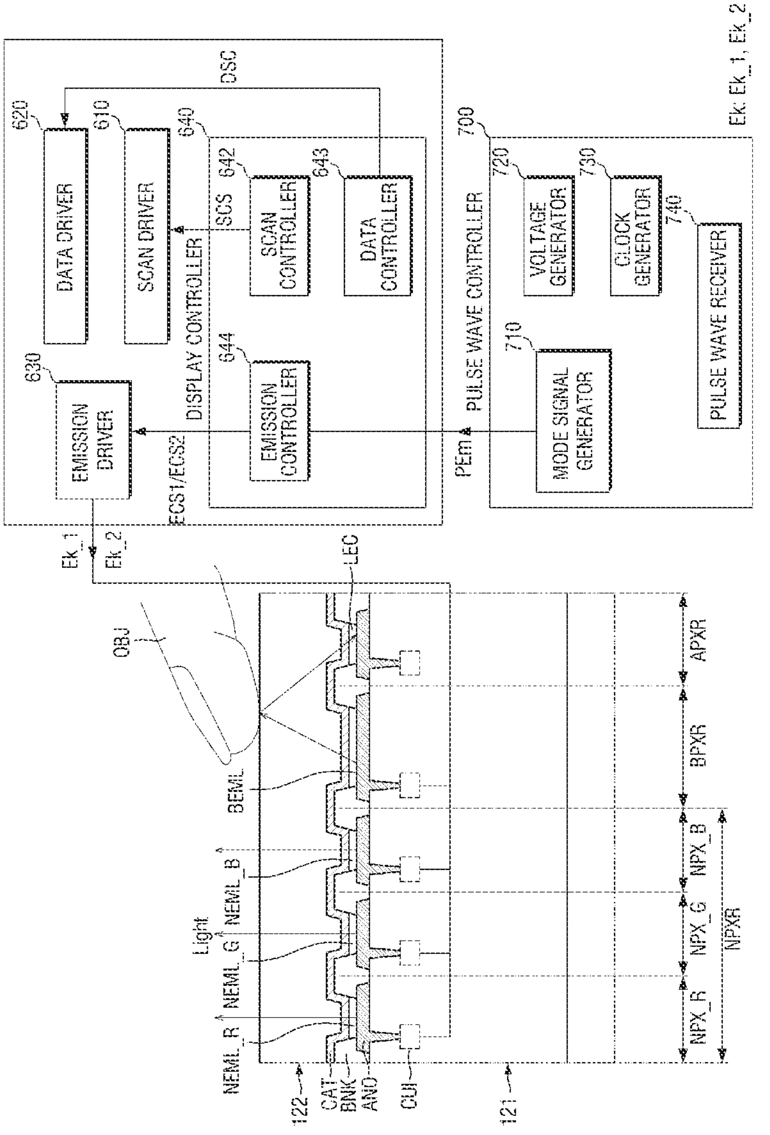
FIG. 9 is a schematic diagram illustrating a light emitting operation of a display device according to an embodiment.

FIG. 9 is a schematic diagram illustrating a light emitting operation of a display device according to an embodiment.

Referring to FIG. 9, a pulse wave controller 700 includes a clock generator 730, a voltage generator 720, and a mode signal generator 710.

The clock generator 730 may output a clock signal. The output clock signal may be provided to the mode signal generator 710. The voltage generator 720 may generate a voltage signal for generating a mode control signal and supply the voltage signal to the mode signal generator 710.

The mode signal generator 710 may change a mode of the display device to one of a first mode and a second mode according to a host or user's choice. For example, the mode signal generator 710 may determine the first mode having a first frame frequency and the second mode having a second frame frequency according to a selection signal SEL (see FIG. 6) of the host.

The mode signal generator 710 may output a mode control signal PEm having a first logic level voltage in the first mode and output the mode control signal PEm having a second logic level voltage in the second mode. The first logic level voltage may be any one of a low logic level voltage and a high logic level voltage, and the second logic level voltage may be the other of the low logic level voltage and the high logic level voltage.

The mode control signal PEm generated by the mode signal generator 710 may include information about a frame frequency. For example, in the case of the first mode, the first frame frequency may be preset within the range of 60 to 120 Hz. In the case of the second mode, the second frame frequency may be preset to any one frequency within the range of 100 to 240 Hz. In an embodiment, the first frame frequency is lower than the second frame frequency. For example, when the first frame frequency is 60 Hz, the second frame frequency may be 100 to 240 Hz. Alternatively, when the first frame frequency is 120 Hz, the second frame frequency may be 121 to 240 Hz.

The mode signal generator 710 may receive a clock signal from the clock generator 730 and receive a voltage signal from the voltage generator 720.

The clock generator 730, the voltage generator 720, and the mode signal generator 710 may be formed as integrated circuits and integrally formed with the pulse wave controller 700 or may be mounted on the pulse wave controller 700.

A display controller 640 includes an emission controller 644, a scan controller 642, and a data controller 643.

The emission controller 644 may supply an emission control signal ECS1/ECS2 for driving an emission driver 630 to the emission driver 630. Specifically, the emission controller 644 may receive the mode control signal PEm from the mode signal generator 710 and transmit the emission control signal ECS1/ECS2 for driving the emission driver 630 to the emission driver 630. For example, the emission controller 644 may receive the mode control signal PEm having the first logic level voltage in the first mode and receive the mode control signal PEm having the second logic level voltage in the second mode. The emission controller 644 may output a first emission control signal ECS1 having the first frame frequency in the first mode according to the mode control signal PEm having the first logic level voltage and may output a second emission control signal ECS2 having the second frame frequency in the second mode according to the mode control signal PEm having the second logic level voltage. The first logic level voltage may be any one of a low logic level voltage and a high logic level voltage, and the second logic level voltage may be the other of the low logic level voltage and the high logic level voltage.

The emission driver 630 may receive the emission control signal ECS1/ECS2 from the display controller 640. The emission driver 630 may generate an emission signal Ek_1/Ek_2 for driving a plurality of pixels PX based on the emission control signal ECS1/ECS2. For example, the emission driver 630 may generate a first emission signal Ek_1 having the first frame frequency in the first mode based on the emission control signal ECS1/ECS2 and may generate a second emission signal Ek_2 having the second frame frequency in the second mode based on the emission control signal ECS1/ECS2. The emission driver 630 may output the first emission signal Ek_1 to the pixels PX in the first mode and output the second emission signal Ek_2 to a plurality of emission lines ELL connected to the pixels PX in the second mode.

The respective first frame frequency and the second frame frequency of the first emission signal Ek_1 and the second emission signal Ek_2 may be different from each other. For example, in the first mode, the first frame frequency of the first emission signal Ek_1 may be selected within the range of 60 to 120 Hz according to the host or user's choice. In the second mode, the second frame frequency of the second emission signal Ek_2 may be selected within the range of 100 to 240 Hz. In addition, the second frame frequency may be higher than the first frame frequency.

Therefore, the emission control signal ECS1/ECS2 output from the emission controller 644 may be input to the emission driver 630 so that the pixels PX can emit light at the first frame frequency or the second frame frequency according to the first mode or the second mode.

The data controller 643 and the scan controller 642 may transmit a data control signal DCS and a scan control signal SCS for controlling a data driver 620 and a scan driver 610 to the data driver 620 and the scan driver 610, respectively.

The data controller 643 and the scan controller 642 may be electrically connected to the data driver 620 and the scan driver 610 through a plurality of data lines DL1 through DLn and a plurality of scan lines SL1 through SLn, respectively.

A display control signal output from the scan driver 610 and the data driver 620 may have the first frame frequency. For example, the display control signal having the first frame frequency may control the pixels PX to emit light at the first frame frequency in the first mode and/or the second mode.

A light emitting layer NEML_R is interposed between a first electrode ANO and a second electrode CAT in the first pixel NPX_R, a light emitting layer NEML_G is interposed between a first electrode ANO and a second electrode CAT in the second pixel NPX_G, and a light emitting layer NEML_B is interposed between a first electrode ANO and a second electrode CAT in the third pixel NPX_B.

Figure 10:
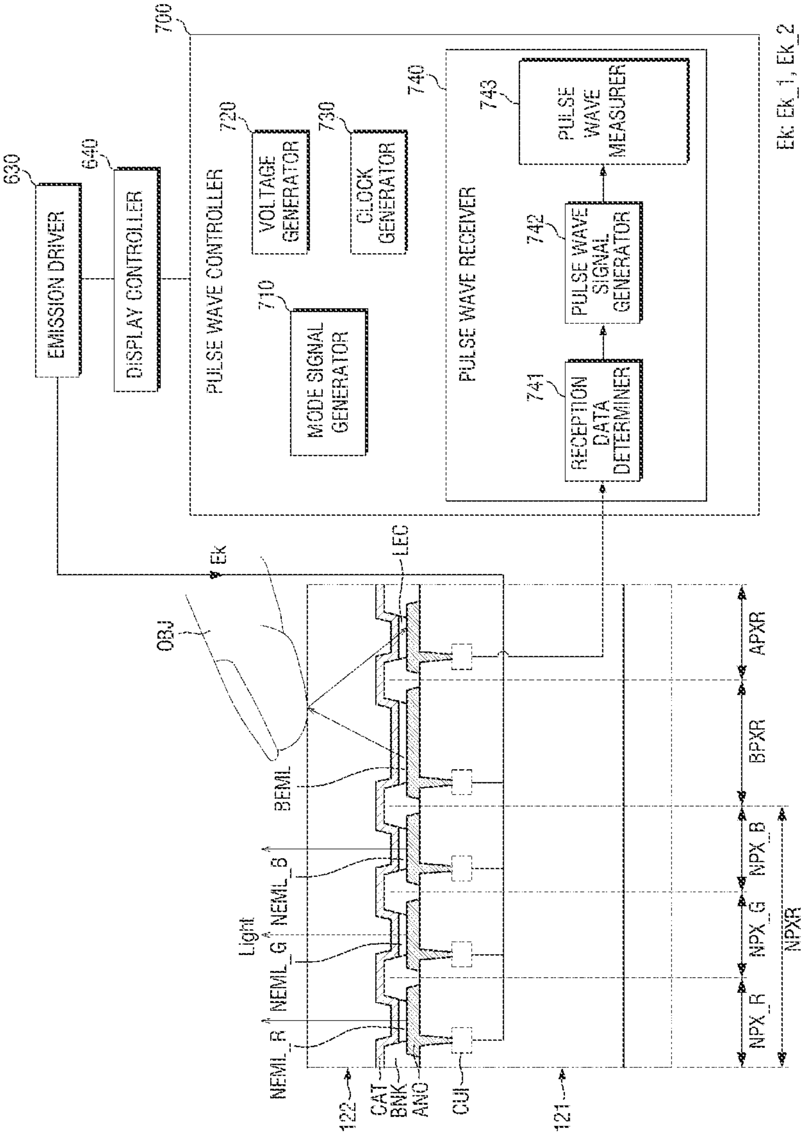
FIG. 10 is a schematic diagram illustrating a light receiving operation of the display device according to the embodiment.
Figure 11:
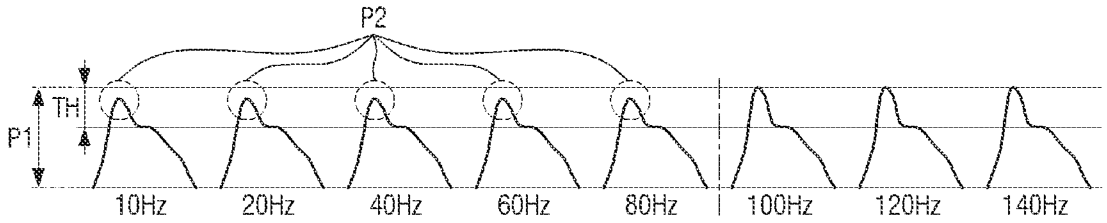
FIG. 11 is a graph illustrating the result of measuring a pulse wave according to an embodiment.

FIG. 10 is a schematic diagram illustrating a light receiving operation of the display device according to the embodiment of FIG. 9. FIG. 11 is a graph illustrating the result of measuring a pulse wave according to an embodiment.

The display controller 640 and the mode signal generator 710, the voltage generator 720 and the clock generator 730 of the pulse wave controller 700 of FIG. 10 are substantially the same as those of FIG. 9. Therefore, a pulse wave receiver 740 of the pulse wave controller 700 for the light receiving operation will be mainly described.

Referring to FIG. 10, the pulse wave receiver 740 may include a light reception data determiner 741, a pulse wave signal generator 742, and a pulse wave measurer 743.

The light reception data determiner 741 determines light reception data regarding the amount of light collected by each optical sensor PS through an electrical signal transmitted from the optical sensor PS. The amount of collected light may be measured based on the second frame frequency. Specifically, the light reception data determiner 741 may accumulate and collect the amount of light according to a frame frequency emitted from a plurality of pixels PX and determine light reception data according to the accumulated amount of light.

The pulse wave signal generator 742 receives the light reception data and generates a photoplethysmography (PPG) signal. The PPG signal is a waveform representing a change in vascular dimension in a peripheral region according to a heartbeat and may be generated through the light reception data.

Referring to FIGS. 10 and 11, a pulse wave signal received by the pulse wave receiver 740 may be measured based on the second frame frequency. Specifically, the pixels PX may emit light at the second frame frequency, and each optical sensor PS may generate a pulse wave signal by accumulating and collecting the amount of light based on the second frame frequency.

The second frame frequency may be different from the first frame frequency. In addition, the second frame frequency may be greater than the first frame frequency. For example, the second frame frequency may be 100 to 240 Hz, and the first frame frequency may be 60 to 240 Hz.

For example, when the second frame frequency is 100 Hz, the pixels PX may emit light at a frame frequency of 100 Hz based on the second emission signal Ek_2. Since the optical sensors PS measure the amount of light in a period in which the pixels PX emit light, they may measure the amount of light at a frame frequency of 100 Hz. The pulse wave controller 700 may generate a pulse wave signal PRS by accumulating a sensing current according to the amount of light of each optical sensor PS.

As illustrated in FIG. 11, when the second frame frequency is less than 100 Hz, a peak value P2 of a pulse wave signal generated by the pulse wave controller 700 may be smaller than a peak value P1 of a pulse wave signal generated when the second frame frequency is 100 Hz or more. That is, when the second frame frequency is less than 100 Hz, a waveform of the pulse wave signal may be distorted. Therefore, when the second frame frequency is less than 100 Hz, if the peak value P2 of the pulse wave signal becomes smaller than a threshold value TH, the pulse wave controller 700 may fail to detect the pulse wave signal. Hence, in order to generate an accurate pulse wave signal, it is desirable for the second frame frequency to be 100 Hz or more.

Figure 12:
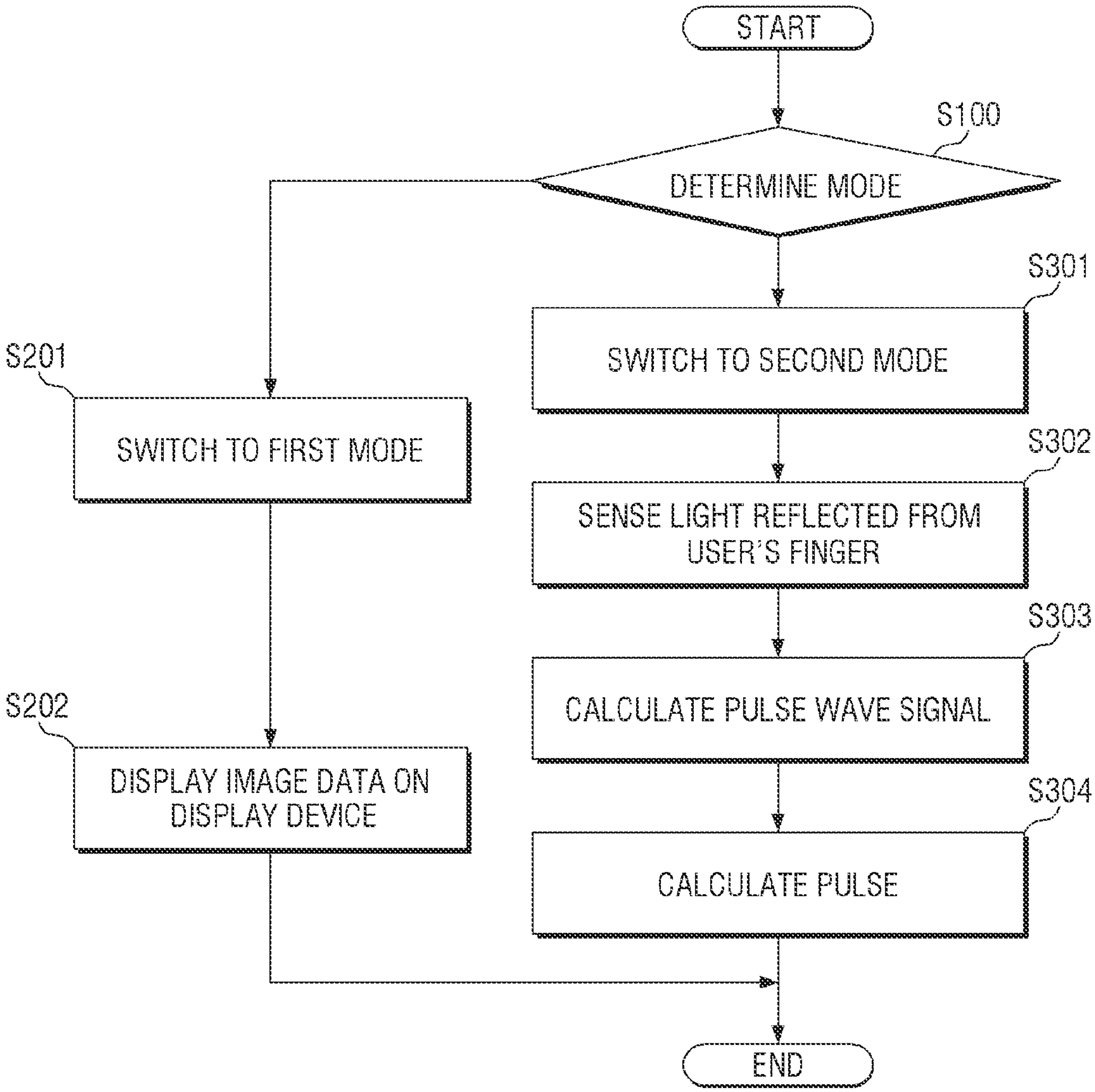
FIG. 12 is a flowchart illustrating a pulse measuring method of a display device according to an embodiment.
Figure 13:
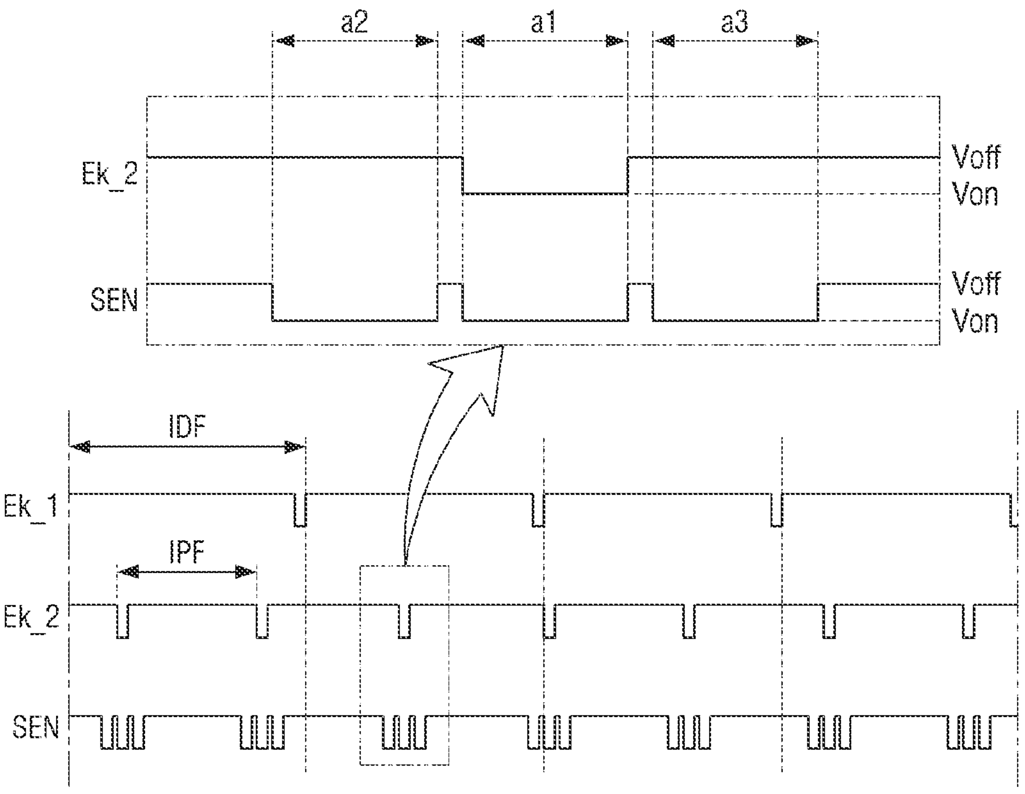
FIG. 13 is a timing diagram illustrating emission signals of the display device according to the embodiment of FIG. 12.

FIG. 12 is a flowchart illustrating a pulse measuring method of a display device according to an embodiment. FIG. 13 is a timing diagram illustrating emission signals of the display device according to the embodiment.

Referring to FIG. 12, first, a mode of the display device is selected or determined (operation S100).

The display device 10 may receive a mode selection request and determine its mode based on the mode selection request. For example, when an image display request is received, the mode of the display device 10 may be determined as a first mode which is a basic mode. Alternatively, when a pulse measurement request is received, the mode of the display device may be determined as a second mode according to a user's request or a preset criterion.

Next, the display device switches to the first mode (operation S201).

In the first mode, an image of a first frame frequency according to the user's input may be displayed in a general active area NPXR and a pulse wave display area BPXR of a display area DPA.

Referring to FIG. 13, a display driver 600 may supply a first emission signal Ek_1 according to the first frame frequency to a plurality of pixels PX to display an image. Specifically, to emit light at the first frame frequency, a display controller 640 may output a first emission control signal ECS1 for displaying an image to an emission driver 630, and the emission driver 630 may output the first emission signal Ek_1 corresponding to the first frame frequency to the pixels PX.

Therefore, light may be emitted in a display frame 1DF (i.e., the first frame frequency) according to the first frame frequency. The first emission signal Ek_1 may be turned on in the display frame 1DF so that the pixels PX can emit light in units of the display frame 1DF. For example, the first emission signal Ek_1 generated according to the first frame frequency by the emission driver 630 may turn on or turn off the pixels PX in units of the display frame 1DF. For example, when the first frame frequency for displaying an image is 60 Hz, the first emission signal Ek_1 may control the pixels PX of a display panel 100 to emit light at 60 Hz corresponding to the first frame frequency.

Accordingly, image data may be displayed on the display device (operation S202).

Alternatively, the display device switches to the second mode (operation S301).

In the second mode, the pulse wave display area BPXR of the display area DPA may emit light at a second frame frequency according to the user's input to measure a pulse wave. In addition, the general active area NPXR of the display area DPA may display an image of the second frame frequency according to the user's input.

The display driver 600 may supply a second emission signal Ek_2 corresponding to the second frame frequency to pixels PX of the pulse wave display area BPXR to measure a pulse wave. Specifically, an emission controller 644 may set a second emission control signal ECS2 according to the second frame frequency based on a mode control signal PEm generated by a mode signal generator 710. The emission driver 630 may receive the set second emission control signal ECS2 and output the second emission signal Ek_2. A plurality of pixels PX may emit light at the second frame frequency based on the second emission signal Ek_2.

For example, when the second frame frequency for measuring a pulse wave is 100 Hz, the second emission signal Ek_2 may control the pixels PX of the display panel 100 to emit light at 100 Hz corresponding to the second frame frequency. In addition, as described above, the pixels PX of the pulse wave display area BPXR may emit red or green light. In response to the second emission signal Ek_2 of the emission driver 630, the pixels PX of the pulse wave display area BPXR may emit light based on the second frame frequency, together with pixels of the general active area NPXR.

In addition, the pixels PX of the general active area NPXR excluding the pulse wave display area BPXR may display an image according to an input in response to the second emission signal Ek_2 generated by the emission driver 630 according to the set second frame frequency.

Next, light reflected from the user's finger is sensed to measure a pulse wave (operation S302).

Referring to FIGS. 12 and 13, when a part of the user's body, for example, a finger OBJ, touches the pulse wave display area BPXR, the pixels PX of the pulse wave display area BPXR emit red or green light. The light is reflected by the finger OBJ and then input to optical sensors PS in a pulse wave measurement area APXR. Each of the optical sensors PS may measure a change in the amount of light received by the optical sensor PS according to the user's pulse wave.

During a pulse wave measurement period a1 according to a pulse wave frame 1PF, the second emission signal Ek_2 is turned on so that the pixels PX can emit light in units of the pulse wave frame 1PF. For example, the second emission signal Ek_2 generated according to the second frame frequency by the emission driver 630 may simultaneously turn on or turn off the pixels PX in units of the pulse wave frame 1PF (i.e., the second frame frequency).

During a turn on period of a sensing signal SEN, the optical sensors PS may measure a pulse wave by measuring the amount of light received. During the pulse wave measurement period a1 of the sensing signal SEN, each of the optical sensors PS may measure a pulse wave by measuring the amount of light received during the pulse wave measurement period a1 in units of the pulse wave frame 1PF. However, in an embodiment, the pixels PX of the pulse wave display area BPXR do not emit light in periods other than the pulse wave measurement period a1. For example, when the second frame frequency for measuring a pulse wave in the second mode is 100 Hz, the amount of light received during the pulse wave measurement period a1 may be measured for each pulse wave frame 1PF. The amount of light measured for each pulse wave frame 1PF may be obtained by accumulating the amount of light received during the pulse wave measurement period a1, and a pulse wave signal may be calculated based on the accumulated amount of light. Therefore, when the second frame frequency is greater than the first frame frequency of the first mode for displaying a general image, the number of times that the amount of light is measured for each pulse wave frame may increase, and an accurate pulse wave may be measured.

To measure an accurate pulse, a constant amount of light may be emitted during the pulse wave measurement period a1 of the optical sensors PS. For example, light received by the optical sensors PS may include light originating from a plurality of pixels PX and/or light incident from the outside (external light) regardless of the pixels PX. In a pulse measuring process, the user places the finger OBJ close to an upper surface of a window member 200. Therefore, light incident on the optical sensors PS originates mainly from the pixels PX. Accordingly, the amount of light emitted from the pixels PX and then reflected from the user's finger OBJ may determine the amount of light received by the optical sensors PS.

Therefore, to exclude the amount of light incident from the outside (external light), the amount of light received during ambient measurement periods a2 and a3 may be measured. The amount of external light received by the optical sensors PS during the ambient measurement periods a2 and a3 may be measured. In an embodiment the pixels PX do not emit light during the ambient measurement periods a2 and a3.

In this case, since external light may also play a role in determining the amount of light received by the optical sensors PS, the amount of light received by the optical sensors PS may be greater than the amount of light received from the pixels PX. Therefore, to measure the amount of light received by the optical sensors PS during the pulse wave measurement period a1 by excluding the amount of external light, the optical sensors PS may measure the amount of light received during the ambient measurement periods a2 and a3. Therefore, by measuring the amount of light received during the ambient measurement periods a2 and a3, it is possible to prevent an error in pulse wave measurement due to the amount of external light received.

Accordingly, the optical sensors PS may measure the amount of light (external light) incident from the outside during the ambient measurement periods a2 and a3 before and after the pulse wave measurement period a1. A light reception data determiner 741 (e.g., a logic circuit) may receive the amount of light emitted from the pixels PX during the pulse wave measurement period a1 and the amount of external light and measure the amount of light received by the optical sensors PS during the pulse wave measurement period a1 by excluding the amount of external light, thereby increasing the accuracy of a pulse measurement.

Next, a pulse wave signal is calculated (operation S303).

The light reception data determiner 741 and a pulse wave signal generator 742 may generate a pulse wave signal using data obtained by measuring a change in the amount of light received by each optical sensor PS.

More specifically, during the systole of the heart, the blood ejected from the left ventricle of the heart moves to peripheral tissues, thus increasing blood volume on the arterial side. In addition, during the systole of the heart, red blood cells carry more oxyhemoglobin to the peripheral tissues. During the diastole of the heart, there is partial suction of blood from the peripheral tissues toward the heart. Here, when light emitted from display pixels is irradiated to peripheral blood vessels, the irradiated light may be absorbed by the peripheral tissues. Light absorbance is dependent on hematocrit and blood volume. The light absorbance may have a maximum value during the systole of the heart and a minimum value during the diastole of the heart. Since the light absorbance is inversely proportional to the amount of light incident on each optical sensor PS, it is possible to estimate the light absorbance at a corresponding time through light reception data regarding the amount of light incident on each optical sensor PS and possible to generate a PPG signal based on the estimated light absorbance.

Finally, a pulse is calculated (operation S304).

Specifically, a change in the amount of light absorbed by each optical sensor PS is proportional to a change in blood flow, and each optical sensor PS receives light obtained after the amount of light absorbed by the finger is subtracted. Accordingly, a change in the amount of light received by each optical sensor PS reflects a change in blood flow. Therefore, it is possible to detect a change in blood volume synchronized with the heartbeat through the light reception data of each optical sensor PS. A pulse wave measurer 743 may estimate pulses of a target region based on times corresponding to peaks of a detected pulse wave signal.

Figure 14:
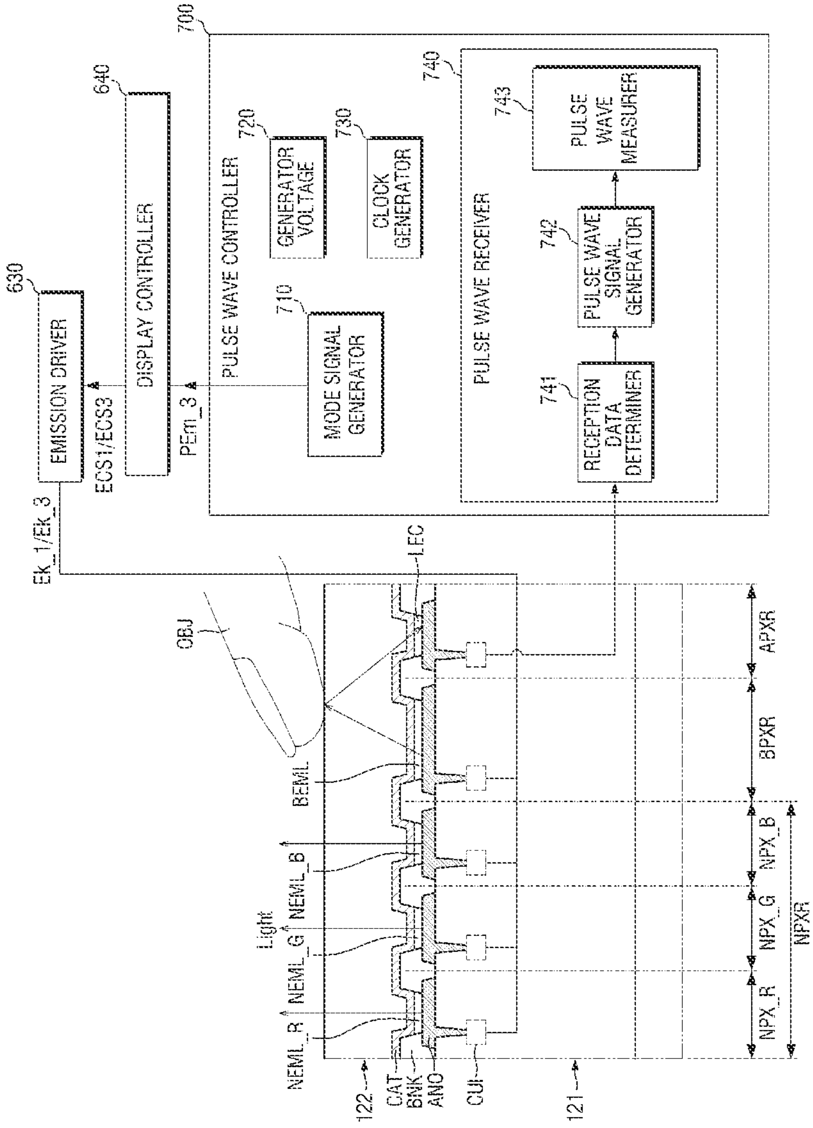
FIG. 14 is a schematic diagram illustrating a light emitting operation of a display device according to an embodiment.
Figure 15:
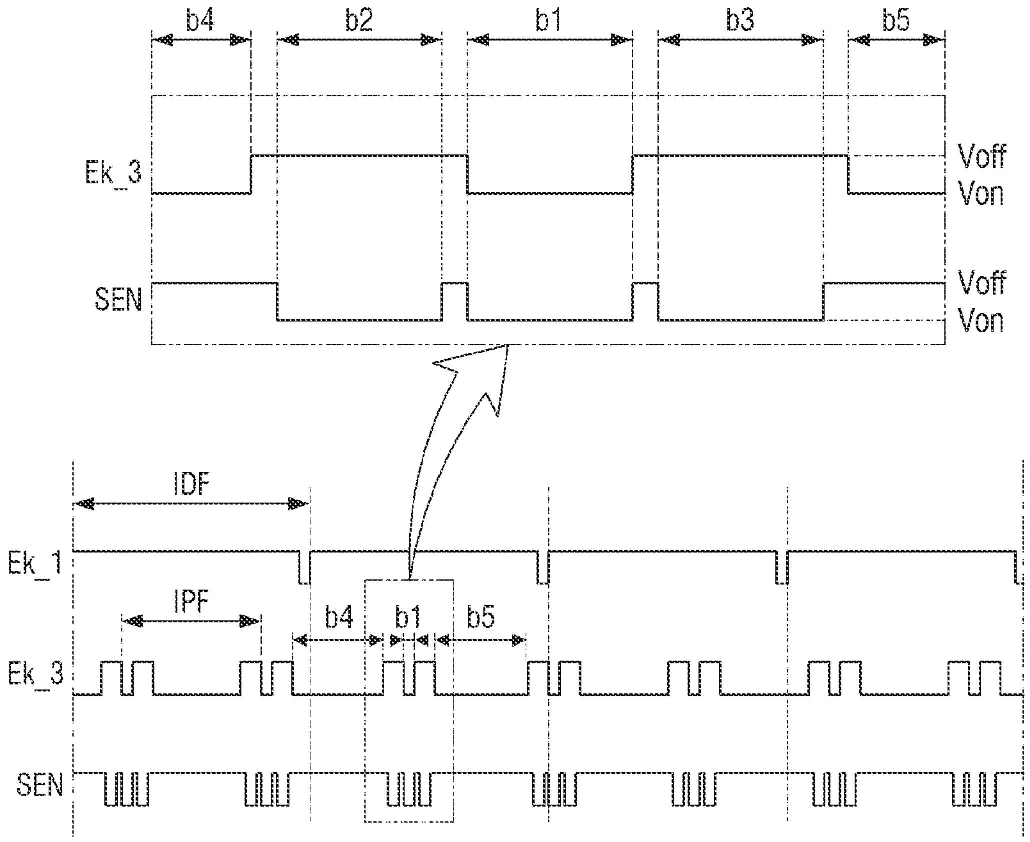
FIG. 15 is a timing diagram illustrating emission signals of the display device according to the embodiment of FIG. 14.

FIG. 14 is a schematic diagram illustrating a light emitting operation of a display device according to an embodiment. FIG. 15 is a timing diagram illustrating emission signals of the display device according to the embodiment.

The embodiment of FIGS. 14 and 15 is substantially the same as the embodiment of FIGS. 9 through 13 except for a mode control signal PEm, an emission control signal ECS1/ECS2, and a second emission signal Ek_2. Therefore, differences will be mainly described.

Referring to FIGS. 14 and 15, in a second mode, a mode signal generator 710 may generate a third pulse wave emission control signal PEm_3 and provide it to an emission controller 644. The third pulse wave emission control signal PEm_3 is a signal for controlling signals emitted from pixels PX according to a frame frequency and may be substantially the same as a second frame frequency of a pulse wave measurement signal.

The emission controller 644 receives the third pulse wave emission control signal PEm_3 and outputs a third emission control signal ECS3 for driving an emission driver 630. The third emission control signal ECS3 may be a signal that is turned on or off so that the emission driver 630 can control the pixels PX to emit light according to the second frame frequency.

Accordingly, the emission driver 630 receives the third emission control signal ECS3 and outputs a third emission signal Ek_3 corresponding to the second frame frequency. In response to the third emission signal Ek_3, not only pixels PX of a pulse wave display area BPXR but also pixels of a general active area NPXR may emit light at the second frame frequency.

In a first mode, the pixels PX may be driven according to a first emission signal Ek_1 corresponding to a first frame frequency, as in the embodiment of FIGS. 9 through 11.

Referring to FIG. 15, the pixels PX of the pulse wave display area BPXR and the pixels of the general active area NPXR may be controlled to be simultaneously turned on or turned off in units of a preset driving period. For example, the third emission signal Ek_3 generated by the emission driver 630 may simultaneously turn on the pixels PX of the pulse wave display area BPXR and the pixels of the general active area NPXR in units of a preset driving period.

Specifically, during a second pulse wave measurement period b1, the third emission signal Ek_3 may be turned on so that the pixels PX of the pulse wave display area BPXR and the pixels of the general active area NPXR can emit light. In addition, each optical sensor PS may measure a pulse wave by measuring the amount of light received during the second pulse wave measurement period b1.

Each optical sensor PS may measure a pulse wave by measuring the amount of light received during a third ambient measurement period b2 before the second pulse wave measurement period b1 and a fourth ambient measurement period b3 after the second pulse wave measurement period b1. However, during the ambient measurement periods b2 and b3, the third emission signal Ek_3 may be turned off so that the pixels PX of the pulse wave display area BPXR and the pixels of the general active area NPXR do not emit light. Accordingly, the amount of external light excluding the amount of light emitted from the pixels PX can be measured, and thus an accurate pulse wave can be measured.

In a first period b4 and a second period b5 excluding the third ambient measurement period b2 and the fourth ambient measurement period b3 which are periods in which the optical sensors PS measure the amount of external light received, the third emission signal Ek_3 may be turned on. Accordingly, during a period in which a pulse wave is not measured, the pixels PX of the pulse wave display area BPXR and the pixels of the general active area NPXR may emit light in response to the third emission signal Ek_3.

In an embodiment according to the disclosure, when a third frame frequency of the third emission signal Ek_3 is low or when a turn-on period is short, a display panel 100 may show a flicker phenomenon. Therefore, the third emission signal Ek_3 may be turned off in the ambient measurement periods b2 and b3 and may be turned on in the other periods to prevent the flicker phenomenon.

Figure 16:
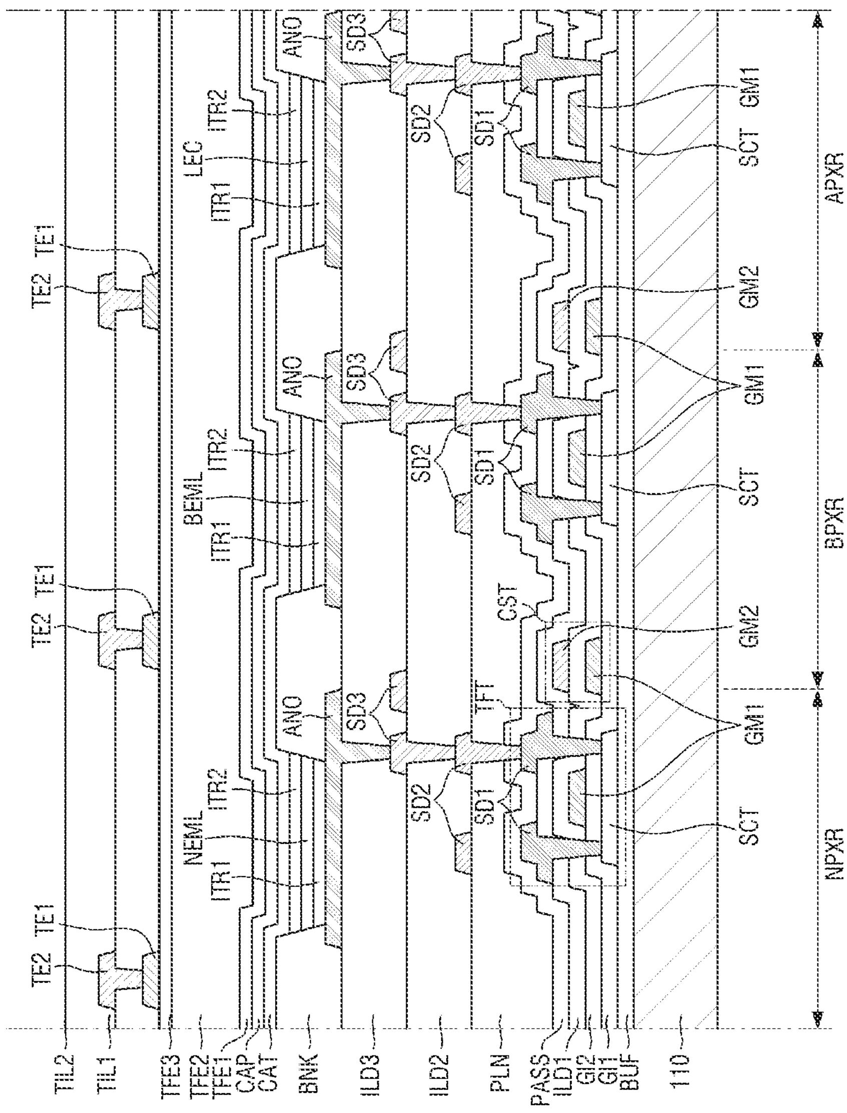
FIG. 16 is an exemplary cross-sectional view of pixels according to an embodiment.

FIG. 16 is an exemplary cross-sectional view of pixels PX according to an embodiment.

Referring to FIG. 16, a circuit layer is disposed on a substrate 110, a light emitting layer and a light receiving layer are disposed on the circuit layer, and a touch layer 130 is disposed on the light emitting layer and the light receiving layer.

The circuit layer includes thin-film transistors TFT, capacitors CST, and various wirings. Each of the thin-film transistors TFT includes a gate electrode, a semiconductor layer SCT, a source electrode, and a drain electrode. Each of the capacitors CST includes a first electrode and a second electrode. A pixel of a general active area NPXR, a pixel PX of a pulse wave display area BPXR, and a thin-film transistor TFT and a capacitor CST of an optical sensor PS may all be formed using the semiconductor layers SCT on the same layer, conductive layers GM1, GM2, SD1, SD2 and SD3, and insulating layers BUF, GI1, GI2, ILD1, PSS, PLN, ILD2 and ILD3.

The circuit layer includes the semiconductor layer SCT constituting a channel of each thin-film transistor TFT, a plurality of conductive layers GM1, GM2, SD1, SD2 and SD3 constituting electrodes or wirings, and a plurality of insulating layers BUF, GI1, GI2, ILD1, PSS, PLN, ILD2 and ILD3.

For example, the gate electrodes of the thin film transistors TFT and the first electrodes of the capacitors CST may be formed of a first conductive layer GM1. In addition, wirings providing various scan signals may be formed of a second conductive layer GM2. The second electrodes of the capacitors CST may be formed of the second conductive layer GM2. The source electrodes and the drain electrodes of the thin-film transistors TFT may be formed of a third conductive layer SD1. A data line, a first voltage line, a second voltage line, and an initialization voltage line may be formed of at least one of the third conductive layer SD1, a fourth conductive layer SD2, and a fifth conductive layer SD3. A connection electrode connecting a first electrode of a light emitting element or a light receiving element to the drain electrode of each thin-film transistor TFT may be formed of at least one of the fourth conductive layer SD2 and the fifth conductive layer SD3.

Each of the first conductive layer GM1 and the second conductive layer GM2 may be a single layer or a multilayer including one or more metals selected from molybdenum (Mo), aluminum (Al), platinum (Pt), palladium (Pd), silver (Ag), magnesium (Mg), gold (Au), nickel (Ni), neodymium (Nd), (Ir), chromium (Cr), calcium (Ca), titanium (Ti), tantalum (Ta), tungsten (W), and copper (Cu), Each of the third conductive layer SD1, the fourth conductive layer SD2, and the fifth conductive layer SD3 may include one or more metals selected from aluminum (Al), molybdenum (Mo), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W) and copper (Cu) and may be formed in a stacked structure of Ti/Al/Ti, Mo/Al, Mo/AlGe/Mo, or Ti/Cu. In an embodiment, the first conductive layer GM1 and the second conductive layer GM2 may be made of the same material, and the third conductive layer SD1, the fourth conductive layer SD2 and the fifth conductive layer SD3 may be made of the same material but may be made of a different material from the first conductive layer GM1 and the second conductive layer GM2. However, embodiments are not limited thereto. In addition, unlike in the drawing, the number of conductive layers in the circuit layer may be reduced to three or four or may be increased to six or more.

The insulating layers BUF, GI1, GI2, ILD1, PSS, PLN, ILD2 and ILD3 are interposed between the different conductive layers GM1, GM2, SD1, SD2 and SD3 and the semiconductor layers SCT. The insulating layers BUF, GI1, GI2, ILD1, PSS, PLN, ILD2 and ILD3 may include a buffer layer BUF covering the substrate 110 and disposed between the substrate 110 and the semiconductor layers SCT, a first gate insulating layer GI1 interposed between the semiconductor layers SCT and the first conductive layer GM1, a second gate insulating layer GI2 interposed between the first conductive layer GM1 and the second conductive layer GM2, a first interlayer insulating film ILD1 disposed on the second conductive layer GM2, a passivation layer PASS disposed on the third conductive layer SD1, a planarization layer PLN disposed on the passivation layer PASS, a second interlayer insulating film ILD2 disposed on the fourth conductive layer SD2, and a third interlayer insulating film ILD3 disposed on the fifth conductive layer SD3. Each of the insulating layers BUF, GI1, GI2, ILD1, PSS, PLN, ILD2 and ILD3 may be made of an inorganic layer such as SiN, SiO or SiON, may be made of an organic layer, may be made of an organic-inorganic layer, or may be made of a stack of an inorganic layer and an organic layer.

The light emitting layer and the light receiving layer are disposed on the circuit layer. Specifically, a light emitting element of the pixel of the general active area NPXR, a light emitting element of the pixel PX of the pulse wave display area BPXR, and a light receiving element of the optical sensor PS are disposed on the circuit layer.

The light emitting element of the pixel of the general active area NPXR includes a first electrode ANO, a second electrode CAT, and a general light emitting layer NEML interposed between the first electrode ANO and the second electrode CAT. The general light emitting layer NEML may be an organic light emitting material. However, embodiments are not limited thereto, and the general light emitting layer NEML may also be an inorganic light emitting material. A hole injection or transport layer ITR1 may be interposed between the first electrode ANO and the general light emitting layer NEML, and an electron injection or transport layer ITR2 may be interposed between the general light emitting layer NEML and the second electrode CAT.

The light emitting element of the pixel PX of the pulse wave display area BPXR includes a first electrode ANO, a second electrode CAT, and a pulse wave light emitting layer BEML interposed between the first electrode ANO and the second electrode CAT. The pulse wave light emitting layer BEML may be an organic light emitting material. However, embodiments are not limited thereto, and the pulse wave light emitting layer BEML may also be an inorganic light emitting material. A hole injection or transport layer ITR1 may be interposed between the first electrode ANO and the pulse wave light emitting layer BEML, and an electron injection or transport layer ITR2 may be interposed between the pulse wave light emitting layer BEML and the second electrode CAT.

The light receiving element of the optical sensor PS includes a first electrode ANO, a second electrode CAT, and a conversion layer LEC interposed between the first electrode ANO and the second electrode CAT. The photoelectric conversion layer LEC may include an organic photoelectric conversion material. However, embodiments are not limited thereto, and the photoelectric conversion layer LEC may also include an inorganic photoelectric conversion material such as an inorganic semiconductor. A hole injection or transport layer ITR1 may be interposed between the first electrode ANO and the photoelectric conversion layer LEC, and an electron injection or transport layer ITR2 may be interposed between the photoelectric conversion layer LEC and the second electrode CAT.

The light emitting element of the pixel of the general active area NPXR, the light emitting element of the pixel PX of the pulse wave display area BPXR, and the first electrode ANO of the light receiving element of the optical sensor PS are disposed on the same layer. In the illustrated example, they are formed of the same material on the third interlayer insulating film ILD3. A bank layer BNK is disposed on the first electrodes ANO. The bank layer BNK has openings exposing the first electrodes ANO, and active layers such as the general light emitting layer NEML, the pulse wave light emitting layer BEML and the photoelectric conversion layer LEC are disposed on the first electrodes ANO exposed by the openings. In addition, the second electrode CAT of the light emitting element of the pixel of the general active area NPXR, the second electrode CAT of the light emitting element of the pixel PX of the pulse wave display area BPXR, and the second electrode CAT of the light receiving element of the optical sensor PS are shared as an integrated common electrode. In addition, the hole injection or transport layer ITR1 of the light emitting element of the pixel of the general active area NPXR, the hole injection or transport layer ITR1 of the light emitting element of the pixel PX of the pulse wave display area BPXR, and the hole injection or transport layer ITR1 of the light receiving element of the optical sensor PS are formed of the same material on the same layer and may be simultaneously formed in the same process, which may be the same for the electron injection or transport layer ITR2. Like this, when the light emitting element of the pixel of the general active area NPXR, the light emitting element of the pixel PX of the pulse wave display area BPXR, and the light receiving element of the optical sensor PS share the materials of the hole injection or transport layer ITR1 and the electron injection or transport layer ITR2, they can be simultaneously formed in one process. Accordingly, this can improve process efficiency.

A capping layer CAP may be disposed on the second electrode CAT of the light emitting element of the pixel of the general active area NPXR, the second electrode CAT of the light emitting element of the pixel PX of the pulse wave display area BPXR and the second electrode CAT of the light receiving element of the optical sensor PS, and a thin-film encapsulation layer TFE may be disposed on the capping layer CAP. The thin-film encapsulation layer TFE (TFE1 through TFE3) may include a first encapsulation layer TFE1 made of an inorganic layer such as SiN, SiO or SiON, a second encapsulation layer TFE2 disposed on the first encapsulation layer TFE1 and including an organic material, and a third encapsulation layer TFE3 disposed on the second encapsulation layer TFE2 and made of an inorganic layer such as SiN, SiO or SiON.

The touch layer 130 is disposed on the thin-film encapsulation layer TFE. The touch layer 130 may include a base layer BAS, first touch conductive layers TE1 disposed on the base layer BAS, a first touch insulating layer TIL1 disposed on the first touch conductive layers TE1, second touch conductive layers TE2 disposed on the first touch insulating layer TIL1 and a second touch insulating layer TIL2 covering the second touch conductive layers TE2.

As described above, the pixel PX of the pulse wave display area BPXR is disposed adjacent to the optical sensor PS. The placement of the pixel PX of the pulse wave display area BPXR may be dependent on the placement of the optical sensor PS.

Figure 17:
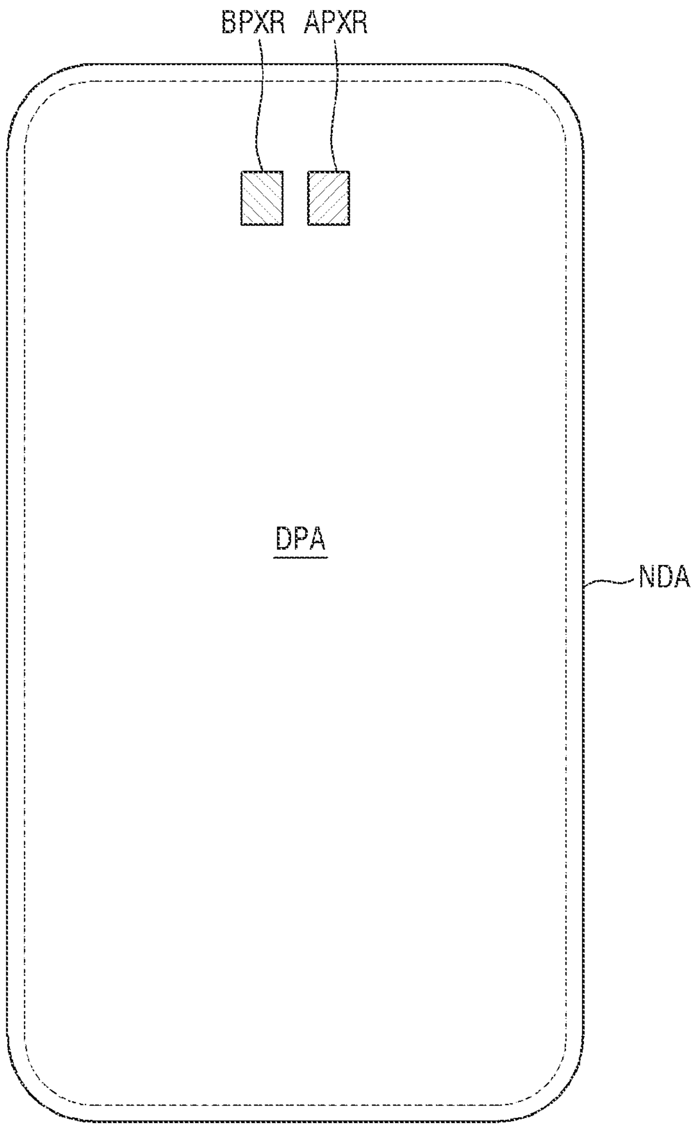
FIG. 17 is a plan view of a display device according to an embodiment.

FIG. 17 is a plan view of a display device according to an embodiment.

Referring to FIG. 17, a pulse wave display area BPXR is disposed in a portion of a display area DPA, and a pulse wave measurement area APXR is disposed on a side (a right side in the drawing) of the pulse wave display area BPXR. In the current embodiment, the pulse wave display area BPXR and the pulse wave measurement area APXR have a rectangular or bar-type shape.

The pulse wave measurement area APXR includes one or more optical sensors PS. The pulse wave measurement area APXR may further include pixels of a general active area NPXR.

The pulse wave display area BPXR includes one or more pixels PX of the pulse wave display area BPXR. The pulse wave display area BPXR may include only the pixels PX of the pulse wave display area BPXR without pixels of the general active area NPXR. However, embodiments are not limited thereto, and the pixels PX of the pulse wave display area BPXR and pixels of the general active area NPXR may also coexist in the pulse wave display area BPXR. When the pixels PX of the pulse wave display area BPXR and pixels of the general active area NPXR coexist in the pulse wave display area BPXR, the pixels PX of the pulse wave display area BPXR may express a specific color of pixels of the general active area NPXR, thereby replacing the pixels of the general active area NPXR corresponding to the color. For example, when the pixels PX of the pulse wave display area BPXR in the pulse wave display area BPXR are red pixels PX of the pulse wave display area BPXR, green and blue pixels of the general active area NPXR are disposed in the pulse wave display area BPXR, but red pixels of the general active area NPXR are not disposed in the pulse wave display area BPXR. However, embodiments are not limited to this example, and pixels of the general active area NPXR emitting the same color as the pixels PX of the pulse wave display area BPXR may also be added to the pulse wave display area BPXR.

Figure 18:
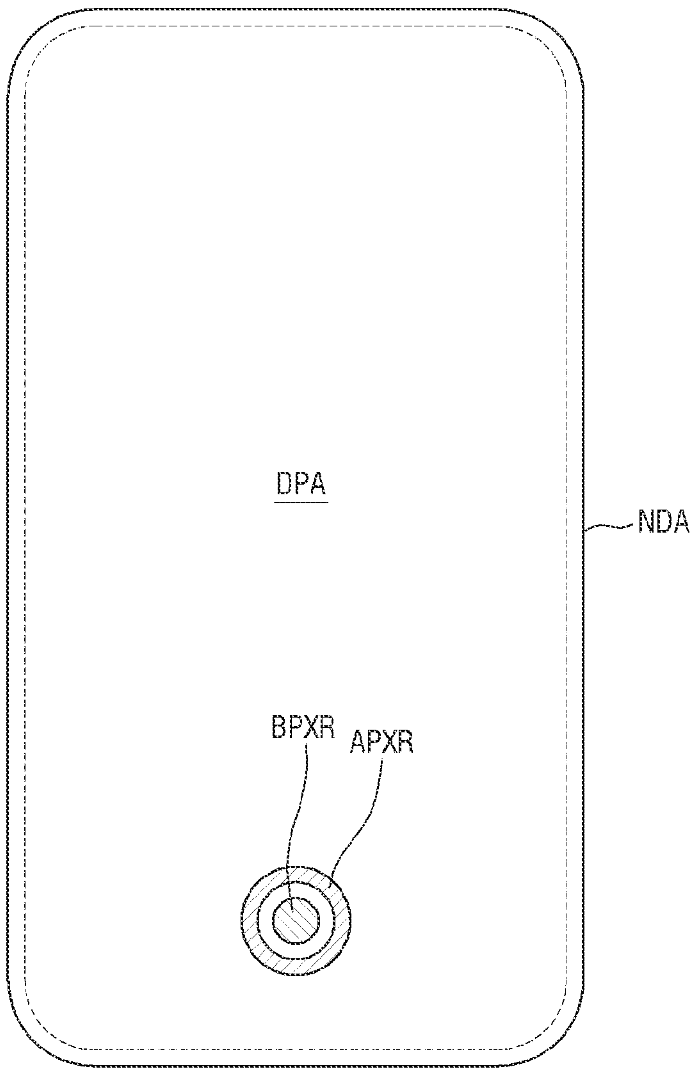
FIGS. 18 through 20 are plan views of display devices according to embodiments.
Figure 19:
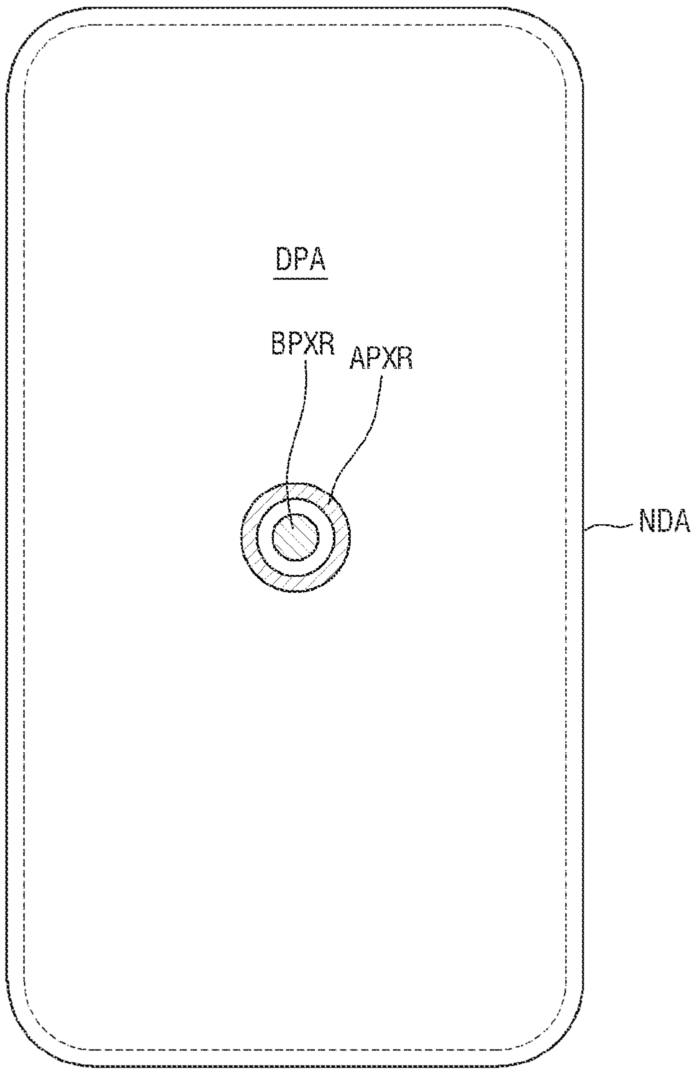
Figure 20:
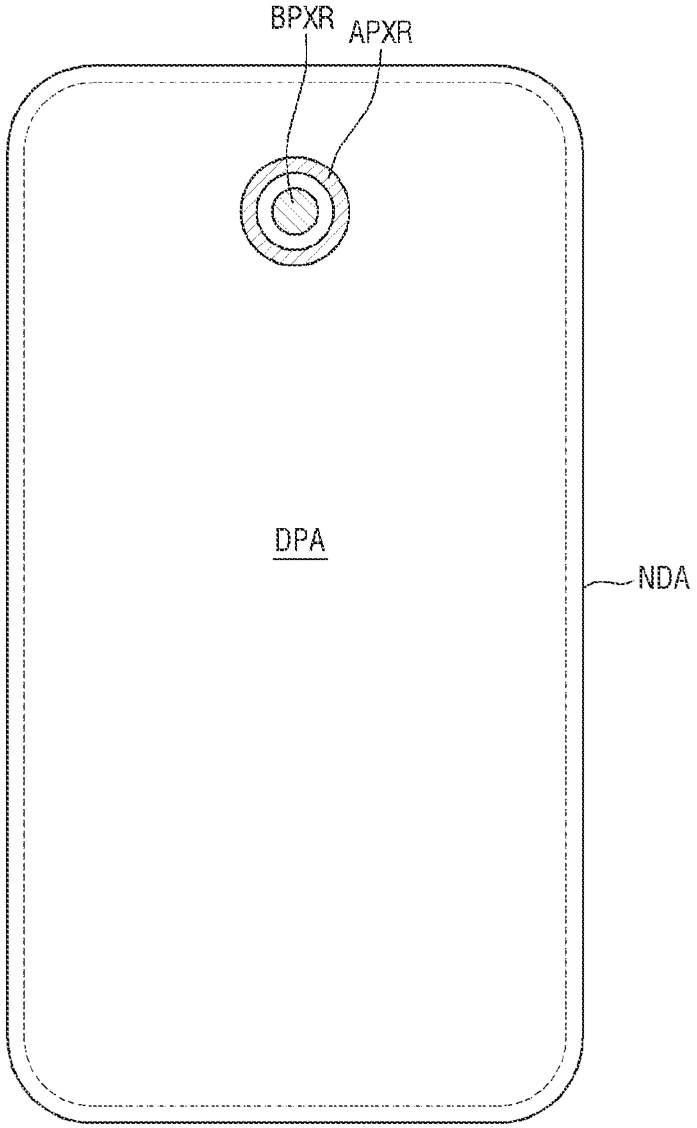

FIGS. 18 through 20 are plan views of display devices according to embodiments.

Referring to FIGS. 18 through 20, the current embodiments are different from the embodiment of FIG. 17 in that a pulse wave measurement area APXR surrounds a pulse wave display area BPXR. The pulse wave display area BPXR is formed in a circular shape in a plan view, and the pulse wave measurement area APXR has a donut or annulus shape surrounding the pulse wave display area BPXR. In the current embodiments, the probability that light emitted from the pulse wave display area BPXR will be received by the pulse wave measurement area APXR surrounding the pulse wave display area BPXR is further increased. Thus, excellent light reception efficiency may be exhibited.

The pulse wave display area BPXR and the pulse wave measurement area APXR may be disposed at various positions in a display area DPA. For example, as illustrated in FIG. 18, the pulse wave display area BPXR and the pulse wave measurement area APXR may be disposed in a lower portion of the display area DPA.

Alternatively, as illustrated in FIG. 19, the pulse wave display area BPXR and the pulse wave measurement area APXR may be disposed in a middle portion of the display area DPA. Alternatively, as illustrated in FIG. 20, the pulse wave display area BPXR and the pulse wave measurement area APXR may be disposed in an upper portion of the display area DPA. However, the arrangement of the pulse wave display area BPXR and the pulse wave measurement area APXR is not limited to those illustrated in the drawings, and the pulse wave display area BPXR and the pulse wave measurement area APXR surrounding the pulse wave display area BPXR may also be freely arranged at various locations within the display area DPA.

Figure 21:
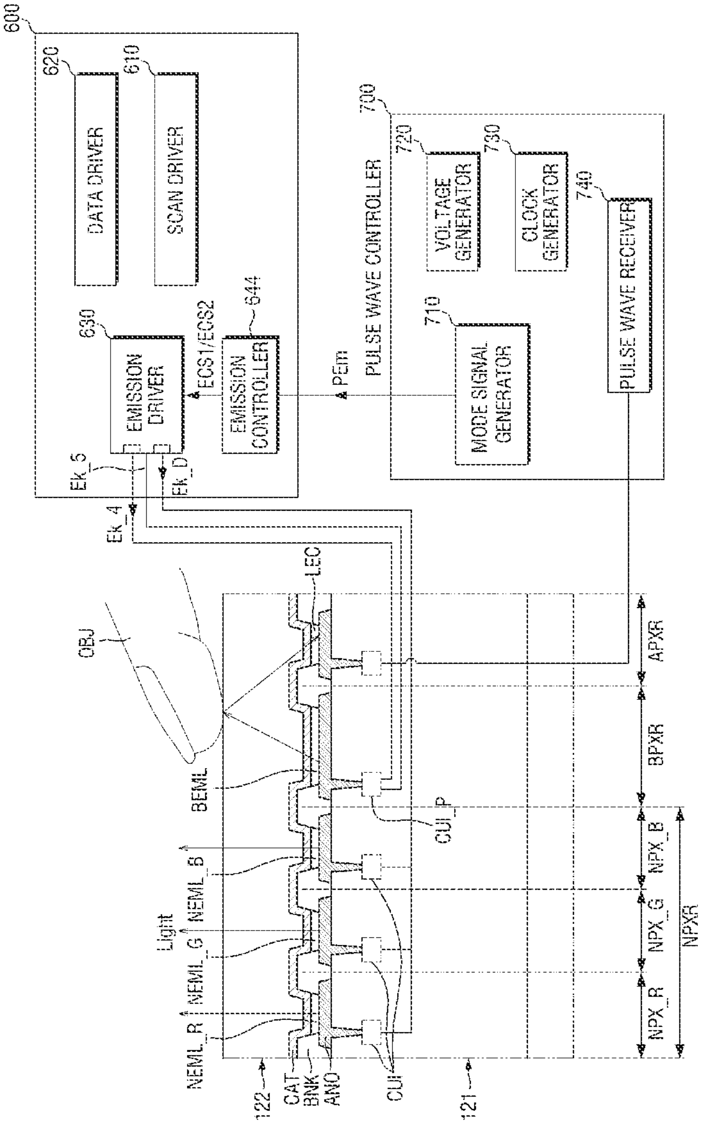
FIG. 21 is a schematic diagram illustrating a light emitting operation of a display device according to an embodiment.
Figure 22:
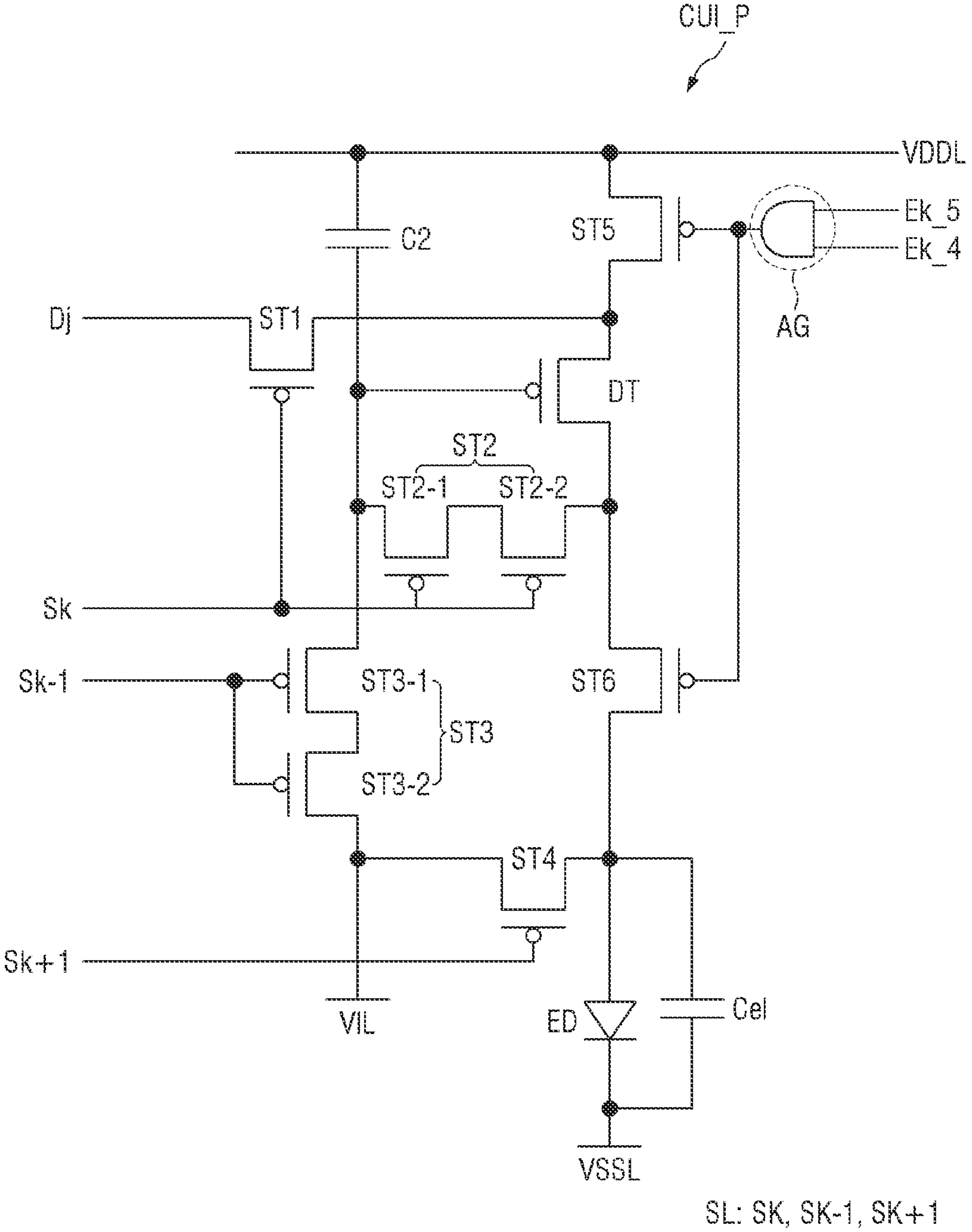
FIG. 22 is a circuit diagram of a pixel circuit according to an embodiment.
Figure 23:
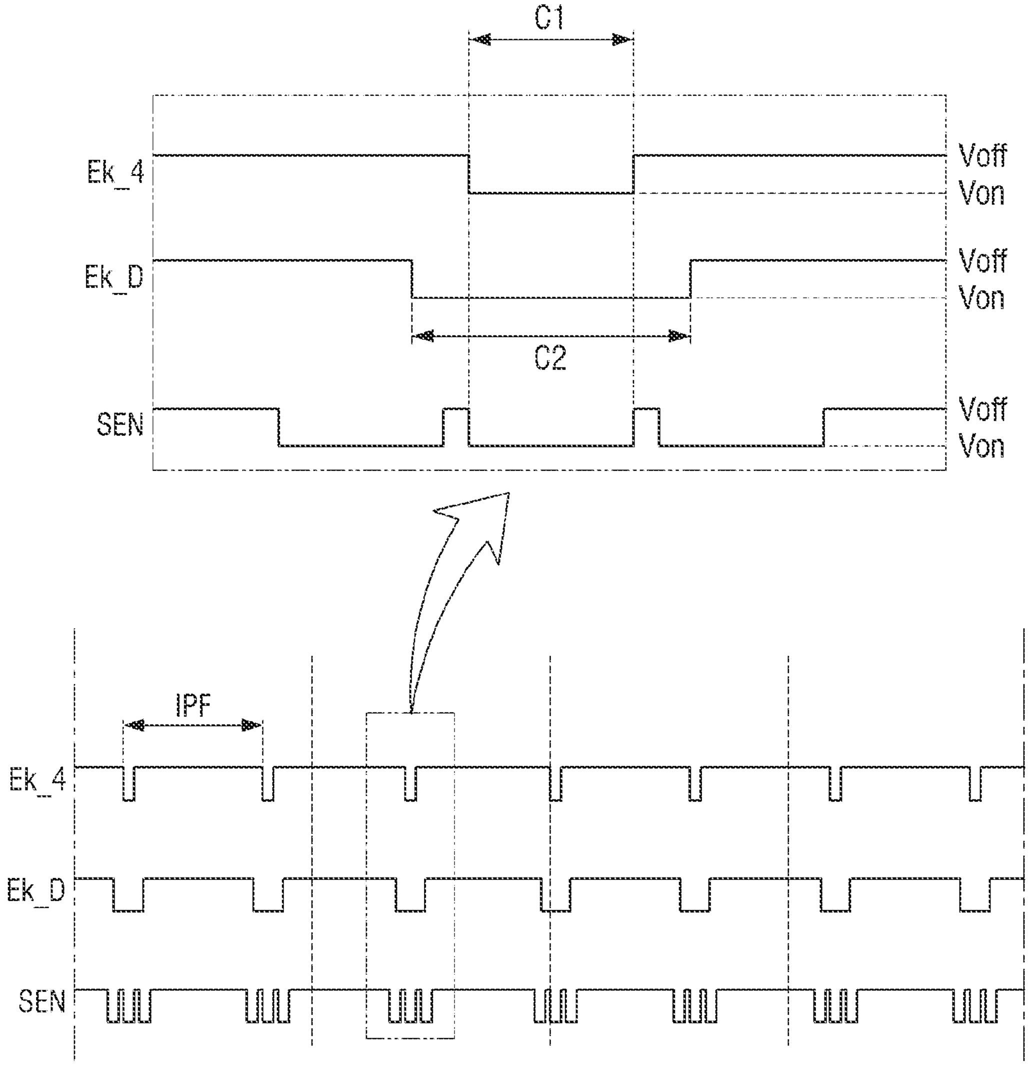
FIG. 23 is a timing diagram illustrating emission signals of the display device according to the embodiment of FIG. 21.
Figure 24:
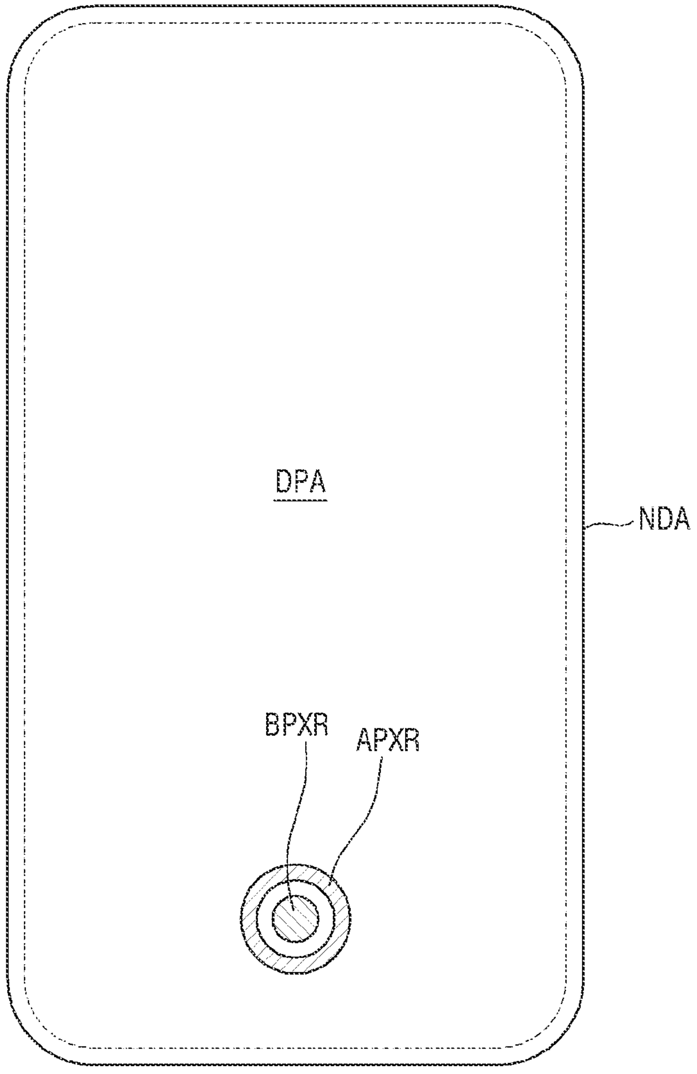
FIG. 24 is a plan view of the display device according to the embodiment of FIG. 21.

FIG. 21 is a schematic diagram illustrating a light emitting operation of a display device according to an embodiment. FIG. 22 is a circuit diagram of a pixel circuit according to an embodiment. FIG. 23 is a timing diagram illustrating emission signals of the display device according to the embodiment. FIG. 24 is a plan view of the display device according to the embodiment.

The embodiment of FIGS. 21 through 24 is different from the embodiment of FIGS. 9 through 11 in that a fourth emission signal Ek_4 corresponding to a fourth frame frequency is transmitted to pixels PX of a pulse wave display area BPXR, a second display emission signal corresponding to a first frame frequency is transmitted to pixels PX of a general active area NPXR, and a separate emission control line is disposed between an emission driver 630 and the pixels PX of the pulse wave display area BPXR.

Referring to FIGS. 21 through 24, the pixels PX of the general active area NPXR will be referred to as general pixels, and the pixels PX of the pulse wave display area BPXR will be referred to as pulse wave display pixels.

In a second mode, a mode signal generator 710 of a pulse wave controller 700 may generate a mode control signal PEm. The mode control signal PEm may be output to an emission controller 644 connected to the mode signal generator 710.

The emission controller 644 may receive the mode control signal PEm. The mode control signal PEm may be a signal for driving an emission control signal of the pixels PX of the pulse wave display area BPXR. However, only a signal for driving the emission control signal of the pixels PX of the pulse wave display area BPXR may be provided.

The emission controller 644 may output an emission control signal ECS1/ECS2 to the emission driver 630 based on the received mode control signal PEm. Accordingly, the emission driver 630 may output the fourth emission signal Ek_4 to the pixels PX of the pulse wave display area BPXR based on the received emission control signal ECS1/ECS2, and the pixels PX of the pulse wave display area BPXR may emit light.

The emission driver 630 may receive the emission control signal ECS and may output the fourth emission signal Ek_4 for controlling the pixels PX of the pulse wave display area BPXR to emit light. Therefore, the pixels PX of the pulse wave display area BPXR may be driven using a separate driving signal to measure a pulse wave.

Referring to FIGS. 21 and 22, a pulse wave display circuit CUI_P for driving the pulse wave display area BPXR may be disposed in a circuit layer 121. The pulse wave display circuit CUI_P may include transistors ST1, ST2 (e.g., ST2-1 and ST2-2), ST3 (e.g., ST3-1 and ST3-2), ST4, ST5, ST6 and ST7. The pulse wave display circuit CUI_P may include capacitors C2 and Cel.

The pulse wave display circuit CUI_P may have a different structure from a pixel circuit CUI. In addition, the pulse wave display circuit CUI_P may be connected to an AND circuit AG. The pulse wave display circuit CUI_P includes a fourth emission line and a display emission line connected to the AND circuit AG. When both the fourth emission signal Ek_4 of the fourth emission line and a second display emission signal Ek_5 of the display emission line have a gate-on voltage, the AND circuit AG may output the gate-on voltage. Specifically, when both the fourth emission signal Ek_4 and the second display emission signal Ek_5 are turn-on signals, pulse wave display pixels BPX may emit light. When only one of the fourth emission signal Ek_4 and the second display emission signal Ek_5 is a turn-on signal and when both the fourth emission signal Ek_4 and the second display emission signal Ek_5 are turn-off signals, the pulse wave display pixels BPX does not emit light. That is, the pulse wave display pixels BPX may emit light when both the fourth emission signal Ek_4 and the second display emission signal Ek_5 are turn-on signals.

The emission driver 630 may output the fourth emission signal Ek_4 at the first frame frequency in a first mode for displaying an image and may output the fourth emission signal Ek_4 at the fourth frame frequency higher than the first frame frequency in the second mode for sensing light using optical sensors.

The emission driver 630 may output the second display emission signal Ek_5 as a gate-on voltage in the first mode and the second mode. In addition, the emission driver 630 may output the second display emission signal Ek_5 at the first frame frequency in the first mode and output the second display emission signal Ek_5 as a gate-on voltage in the second mode.

In summary, when the fourth emission signal Ek_4 and the second display emission signal Ek_5 are input to the pulse wave display circuit CUI_P based on a second frame frequency, a corresponding pixel PX of the pulse wave display area BPXR may emit light at the second frame frequency.

The pixels PX of the general active area NPXR in the second mode and/or the pixels PX in a general image display mode may emit light according to the first frame frequency.

The emission controller 644 of a display controller 640 may generate the emission control signal ECS for driving a first display emission signal Ek_D of the pixels of the general active area NPXR. For example, the emission control signal ECS may be generated by the emission controller 644 to control the pixels of the general active area NPXR to emit light.

The emission control signal ECS generated by the emission controller 644 may be provided to the emission driver 630 at the first frame frequency. The emission control signal ECS may control the first display emission signal Ek_D for controlling the pixels of the general active area NPXR to emit light.

The emission driver 630 may receive the emission control signal ECS and output the first display emission signal Ek_D for controlling the pixels of the general active area NPXR to emit light. The emission driver 630 may output the first display emission signal Ek_D at the first frame frequency in the first mode and the second mode.

Figure 25:
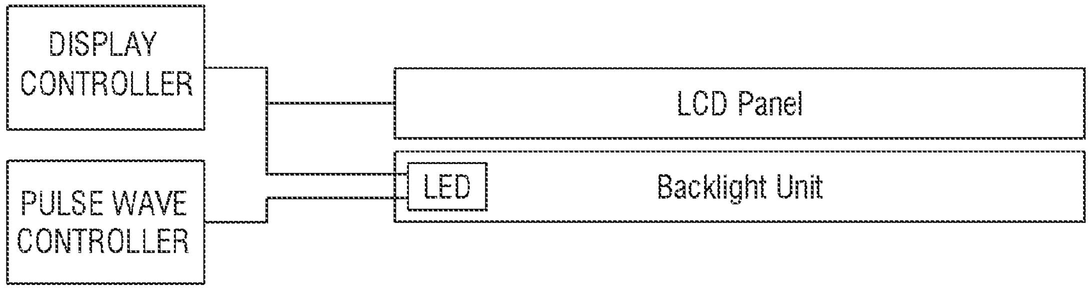
FIG. 25 is a cross-sectional view of a display device according to an embodiment.
Figure 26:
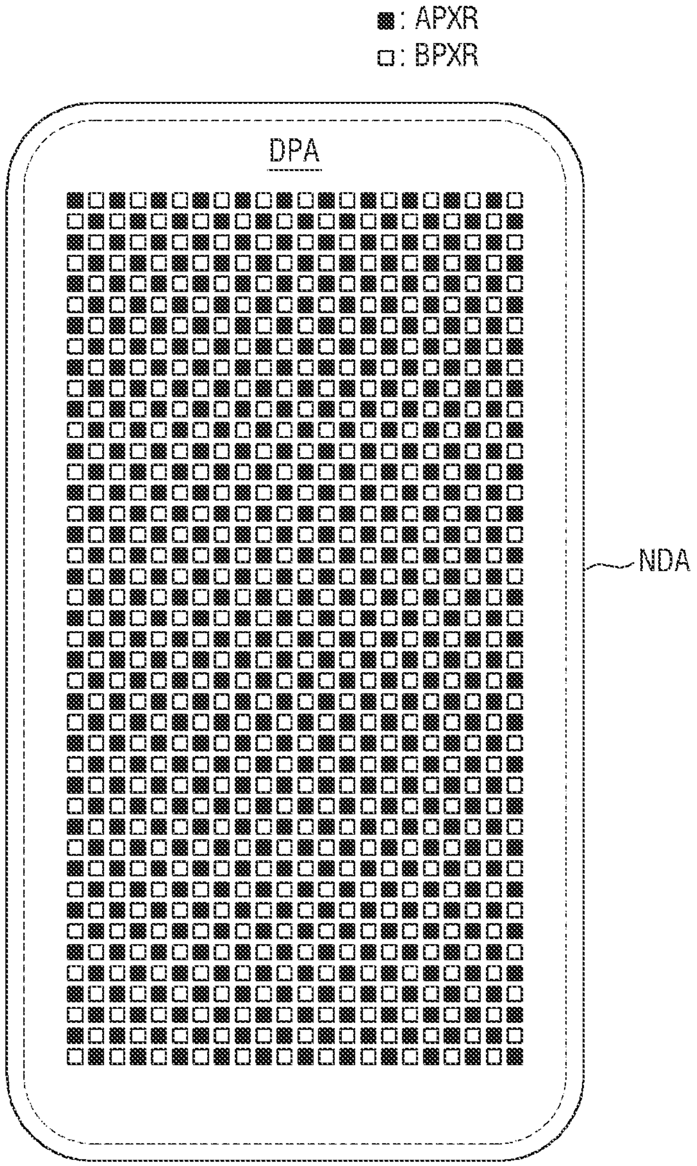
FIG. 26 is a plan view of the display device according to the embodiment of FIG. 25.

FIG. 25 is a cross-sectional view of a display device according to an embodiment. FIG. 26 is a plan view of the display device according to the embodiment.

The embodiment of FIGS. 25 and 26 is different from the embodiment of FIGS. 8 through 12 in that it is a pulse wave measuring method of an LCD panel.

Referring to FIGS. 25 and 26, the LCD panel includes a liquid crystal panel and a backlight unit. The backlight unit may also be included in the display panel 100 of FIGS. 8 through 12.

Therefore, the backlight unit may include a display driver 600 including a scan driver 610, a data driver 620, an emission driver 630, and a display controller 640 as in the embodiment of FIGS. 8 through 12.

The LCD panel includes a pulse wave controller 700. Therefore, an emission controller 644 may transmit an emission control signal ECS1/ECS2 to the emission driver 630 in response to a mode control signal PEm generated by the pulse wave controller 700 based on the frequency of update of pixels PX. Accordingly, the emission driver 630 may simultaneously control the light emission of not only pixels PX of a pulse wave display area BPXR of the backlight unit but also pixels of the pulse wave measurement area APXR. This makes it possible to measure an accurate pulse wave and improve the visibility of the display panel 100.

In a display device and a method of driving the same according to an embodiment, different frame frequencies are used in a first mode for displaying a general image and a second mode for measuring a pulse wave. Therefore, the waveform distortion of a pulse wave signal can be prevented.

However, the effects of the disclosure are not restricted to the one set forth herein. The above and other effects of the disclosure will become more apparent to one of ordinary skill in the art to which the disclosure pertains by referencing the claims.

In concluding the detailed description, those skilled in the art will appreciate that many variations and modifications can be made to the embodiments without substantially departing from the principles of the invention. Therefore, the disclosed embodiments of the invention are used in a generic and descriptive sense only and not for purposes of limitation.

What is claimed is:

1. A display device comprising:

a plurality of pixels;

a plurality of optical sensors;

an emission line connected to a gate of a transistor of the pixels that is connected between a driving voltage and a light emitting element connected to one of the optical sensors via a common voltage line;

an emission driver connected to the emission line, wherein the emission driver outputs a first emission signal to the emission line having a first frame frequency in a first mode for displaying an image using the pixels and outputs a second emission signal to the emission line having a second frame frequency in a second mode for sensing light using the optical sensors, and the second frame frequency is different from the first frame frequency.

2. The display device of claim 1, wherein the second frame frequency is higher than the first frame frequency.

3. The display device of claim 1, further comprising:

a scan line and a data line connected to the pixels; and a display driver comprising a scan driver connected to the scan line and a data driver connected to the data line, wherein the display driver outputs a display control signal having the first frame frequency in the first mode and the second mode.

4. The display device of claim 3, wherein the second frame frequency is higher than the first frame frequency.

5. The display device of claim 4, wherein the first frame frequency ranges from 60 to 120 Hz, and the second frame frequency ranges from 100 to 240 Hz.

6. The display device of claim 1, further comprising:

an emission controller outputting a first emission control signal to the emission driver in the first mode and outputting a second emission control signal to the emission driver in the second mode.

7. The display device of claim 6, further comprising:

a pulse wave controller outputting a mode control signal indicating one of the first mode and the second mode to the emission controller.

8. The display device of claim 7, wherein the pulse wave controller comprises:

a pulse wave receiver measuring a pulse using a pulse wave signal received from each of the optical sensors.

9. The display device of claim 8, wherein the pulse wave receiver comprises:

a light reception data determiner receiving an electrical signal from each of the optical sensors and determining light reception data;

a pulse wave signal generator generating a pulse wave signal using the light reception data; and a pulse wave measurer measuring a pulse using the pulse wave signal.

10. A display device comprising:

a plurality of pixels;

a plurality of optical sensors;

a scan line connected to the pixels;

an emission line connected to a gate of a transistor of the pixels that is connected between a driving voltage and a light emitting element connected to one of the optical sensors via a common voltage line;

a scan driver connected to the scan line; and an emission driver connected to the emission line, wherein the scan driver outputs a scan signal having a first frame frequency to the scan line in a pulse wave measurement mode for sensing light using the optical sensors, and the emission driver outputs an emission signal having a second frame frequency different from the first frame frequency to the emission line in the pulse wave measurement mode.

11. The display device of claim 10, wherein the second frame frequency is higher than the first frame frequency.

12. The display device of claim 11, wherein the emission driver outputs a second emission signal to the emission line having the first frame frequency in the pulse wave measurement mode.

13. The display device of claim 12, further comprising:

an emission controller outputting a first emission control signal to the emission driver in a first mode for displaying an image using the pixels and outputting a second emission control signal to the emission driver in the pulse wave measurement mode.

14. A display device comprising:

a general pixel;

a pulse wave display pixel;

a first emission line connected to the general pixel for providing a first emission signal to the general pixel;

an AND circuit connected to the pulse wave display pixel; and a second emission line and a third emission line connected to the AND circuit, wherein the AND circuit outputs a gate-on voltage when both a second emission signal of the second emission line and a third emission signal of the third emission line have the gate-on voltage.

15. The display device of claim 14, further comprising:

an optical sensor; and an emission driver outputting the second emission signal at a first frame frequency in a first mode for displaying an image using the general pixel and the pulse wave display pixel and outputting the second emission signal at a second frame frequency higher than the first frame frequency in a second mode for sensing light using the optical sensor.

16. The display device of claim 15, wherein the emission driver outputs the third emission signal as the gate-on voltage in the first mode and the second mode.

17. The display device of claim 16, wherein the emission driver outputs the third emission signal at the first frame frequency in the first mode and outputs the third emission signal as the gate-on voltage in the second mode.

18. The display device of claim 17, wherein the emission driver outputs the first emission signal of the first emission line at the first frame frequency in the first mode and the second mode.

19. A method of driving a display device, the method comprising:

outputting a first emission signal to a gate of a transistor of a plurality of pixels based on a first frame frequency in a first mode, wherein the transistor is connected between a driving voltage and a light emitting element connected to one of a plurality of optical sensors of the display device via a common voltage line;

outputting a second emission signal to the gate of the transistor of the pixels based on a second frame frequency different from the first frame frequency in a second mode;

sensing light reflected from a user onto at least one of the optical sensors in the second mode;

calculating a pulse wave signal based on the sensed light in the second mode; and calculating a pulse based on the pulse wave signal in the second mode.

20. The method of claim 19, wherein the second frame frequency is higher than the first frame frequency.

* * * * *